US011727418B2

(12) United States Patent
Yamane et al.

(10) Patent No.: US 11,727,418 B2
(45) Date of Patent: Aug. 15, 2023

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Josuke Yamane, Nisshin (JP); Naoya Oka, Nagakute (JP); Ryosuke Yamamoto, Nagoya (JP); Kaori Okuda, Ogaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 17/220,222

(22) Filed: Apr. 1, 2021

(65) Prior Publication Data

US 2021/0312475 A1 Oct. 7, 2021

(30) Foreign Application Priority Data

Apr. 3, 2020 (JP) ................. 2020-067916

(51) Int. Cl.
*G06Q 30/0201* (2023.01)
*G06Q 50/00* (2012.01)

(52) U.S. Cl.
CPC ......... *G06Q 30/0201* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2015/0254369 A1* | 9/2015 | Hou | G06F 16/248 |
| | | | 707/798 |
| 2017/0255966 A1* | 9/2017 | Khoury | B60W 40/00 |
| (Continued) | | | |

FOREIGN PATENT DOCUMENTS

| | | |
|---|---|---|
| CN | 106897919 A * | 6/2017 |
| JP | 2008276586 A * | 11/2008 |
| (Continued) | | |

OTHER PUBLICATIONS

Schill, Emily Claire, "The Price of Public Land: An Analysis of Visitor Responsiveness to National Park Entrance Fees." Undergraduate Honors Theses at Brigham Young University. 72. Mar. 16, 2019. (Year: 2019).*

(Continued)

*Primary Examiner* — Susanna M. Diaz
(74) *Attorney, Agent, or Firm* — Sughrue Mion, PLLC

(57) ABSTRACT

The present disclosure includes an object to acquire information indicating a tendency on a visit spot for each vehicle sort.
The present disclosure provides an information processing apparatus including a controller configured to execute: acquiring first information about a plurality of vehicles, the first information including vehicle information about a vehicle, the first information not being capable of identifying an individual user or an individual vehicle but reflecting at least part of attributes or preferences of a user associated with the vehicle, and spot information about a visit spot of the vehicle; and acquiring tendency information indicating a tendency on the visit spot of the vehicle for each vehicle classification based on the vehicle information, from the first information about the plurality of vehicles.

4 Claims, 20 Drawing Sheets

(56) References Cited

U.S. PATENT DOCUMENTS

| | | | |
|---|---|---|---|
| 2019/0073410 A1* | 3/2019 | Booker | G06F 16/355 |
| 2019/0080596 A1 | 3/2019 | Suzuki | |
| 2020/0249046 A1* | 8/2020 | Mayberry | G01C 21/3617 |
| 2021/0065224 A1* | 3/2021 | Kawashima | B60W 40/12 |

FOREIGN PATENT DOCUMENTS

| | | | | |
|---|---|---|---|---|
| JP | 2009199316 A | * | 9/2009 | |
| JP | 2011-198334 A | | 10/2011 | |
| JP | 2019-053467 A | | 4/2019 | |
| JP | 2019-121232 A | | 7/2019 | |
| KR | 2015018121 A | * | 2/2015 | G06Q 50/10 |

OTHER PUBLICATIONS

English Translation of JP-2009199316-A. (Year: 2009).*

* cited by examiner

Fig. 4

EXAMPLE OF DATA STRUCTURE
OF VEHICLE INFORMATION DATABASE

| VEHICLE TYPE | MANUFACTURER | VEHICLE NAME | MODEL | VEHICLE BODY STYLE | LUXURY RANK |
|---|---|---|---|---|---|
| | | | | | |
| | | | | | |
| | | | | | |
| | | | | | |
| | | | | | |

FIG. 5

EXAMPLE OF DATA STRUCTURE OF
SPOT INFORMATION DATABASE

| SPOT ID | SPOT NAME | POSITION | LARGE GENRE | MEDIUM GENRE | SMALL GENRE | PRICE RANGE | CAMERA ID |
|---|---|---|---|---|---|---|---|
| LA01 | | | RESTAURANT | JAPANESE CUISINE | SUSHI | HIGH | |
| LA02 | | | RETAIL STORE | FASHION | WOMEN'S CLOTHING | MEDIUM | |
| LA03 | | | LEISURE FACILITY | ACCOMMODATION | HOTEL | LOW | |

Fig. 6

EXAMPLE OF DATA STRUCTURE OF CAMERA INFORMATION DATABASE

| CAMERA ID | POSITION | SPOT ID |
|---|---|---|
| CA01 | | |
| CA02 | | |
| CA03 | | |
| CA04 | | |
| CA05 | | |

EXAMPLE OF DATA STRUCTURE OF VISIT HISTORY INFORMATION DATABASE

| TIME STAMP | VEHICLE INFORMATION | | | | |
|---|---|---|---|---|---|
| | VEHICLE NAME | VEHICLE BODY STYLE | BODY COLOR | VEHICLE MODEL YEAR | LUXURY RANK |
| | | | | | |
| | | | | | |
| | | | | | |

| VISIT SPOT INFORMATION | | | | | |
|---|---|---|---|---|---|
| SPOT ID | LARGE GENRE | MEDIUM GENRE | SMALL GENRE | POSITION | PRICE RANGE |
| | | | | | |
| | | | | | |
| | | | | | |

Fig. 8
EXAMPLE OF DATA STRUCTURE OF VEHICLE
PROVISION INFORMATION DATABASE

| VEHICLE ID | TIME STAMP | VEHICLE TYPE | BODY COLOR | VEHICLE MODEL YEAR | POSITION INFORMATION |
|---|---|---|---|---|---|
|  |  |  |  |  |  |
|  |  |  |  |  |  |
|  |  |  |  |  |  |
|  |  |  |  |  |  |
|  |  |  |  |  |  |

Fig. 9

EXAMPLE OF DATA STRUCTURE OF CAMERA PROVISION INFORMATION DATABASE

| TIME STAMP | CAMERA ID | VEHICLE NAME | VEHICLE BODY STYLE | BODY COLOR |
|---|---|---|---|---|
| | | | | |
| | | | | |
| | | | | |

FIG. 10

EXAMPLE OF DATA STRUCTURE OF SNS PROVISION INFORMATION DATABASE

| TIME STAMP | SNS ID | POST ID | VEHICLE NAME | VEHICLE BODY STYLE | BODY COLOR | POSITION | SPOT ID |
|---|---|---|---|---|---|---|---|
| | | | | | | | |
| | | | | | | | |
| | | | | | | | |

Fig. 11

<EXTRACTION CONDITION>

FROM YEAR 2020 MONTH 1 TO YEAR 2020 MONTH 3

ABOUT

ATTRIBUTE OF VEHICLE INFORMATION ▼ | CATEGORY ▼ |

VEHICLE NAME
VEHICLE BODY STYLE
BODY COLOR
MODEL YEAR
(ALL)

ATTRIBUTE OF VISIT SPOT INFORMATION ▼ | CATEGORY ▼ |

<TOTALING CONDITION>

TOTAL ACCORDING TO
    ATTRIBUTE OF VEHICLE INFORMATION ▼  FOR EACH
AND
    ATTRIBUTE OF VISIT SPOT INFORMATION ▼  FOR EACH

[+]

<OUTPUT CONDITION>
OUTPUT ACCORDING TO
OUTPUT FORMAT ▼

1100

DISPLAY OF ATTRIBUTE INFORMATION

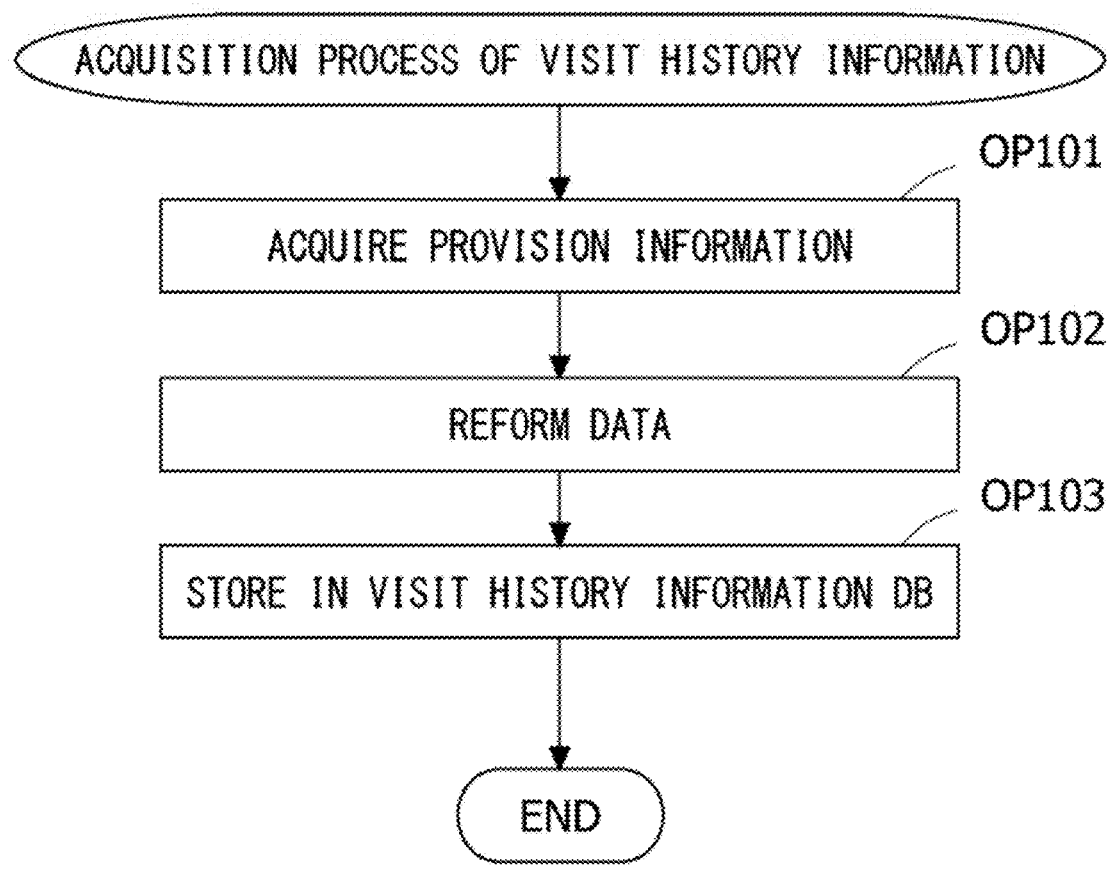

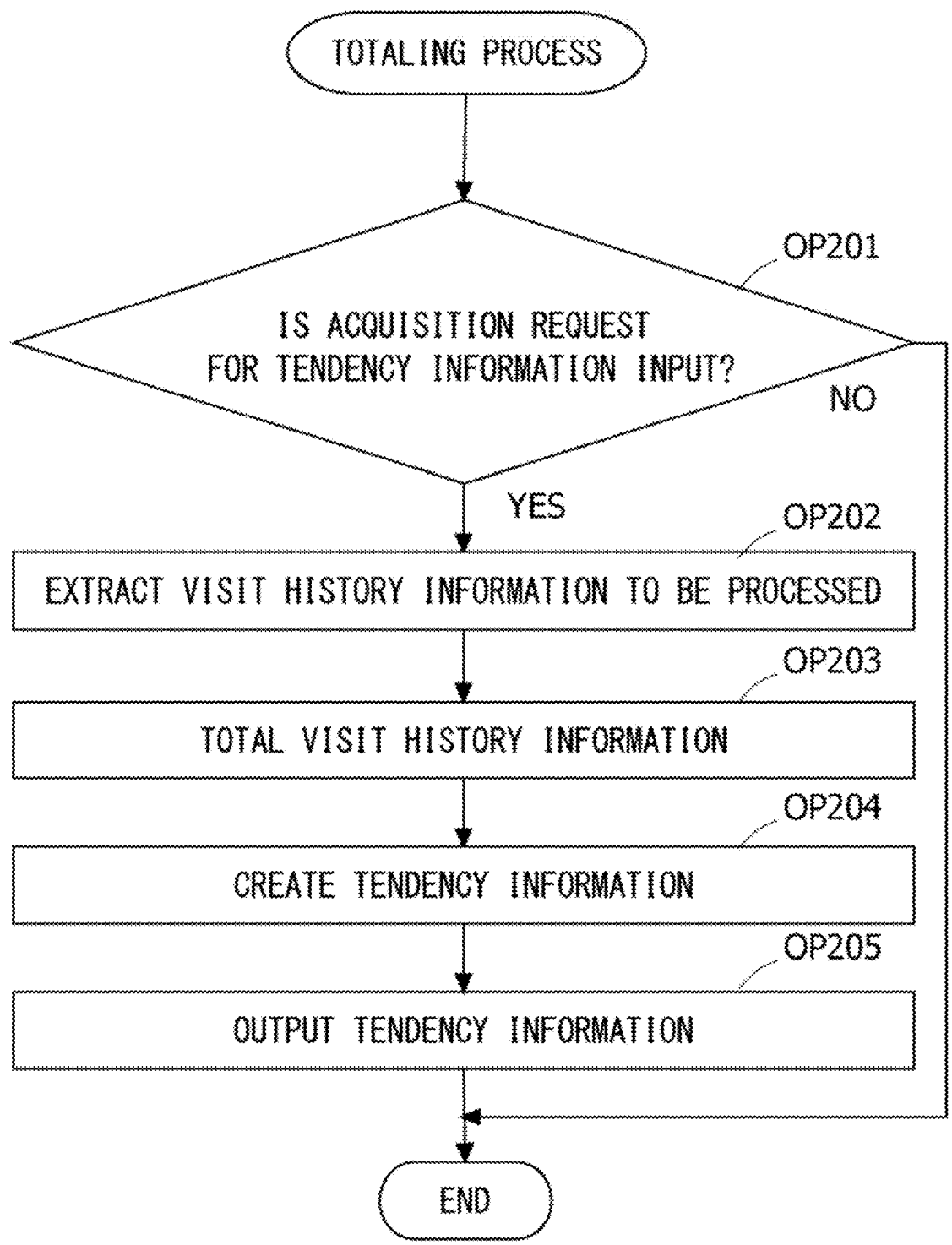

Fig. 14

EXAMPLE OF OUTPUT OF TENDENCY INFORMATION
(TOTALING TABLE FORMAT)

| SPOT ID / VEHICLE NAME | LA01 | LA02 | ... |
|---|---|---|---|
| TY01 | 0 | 20 | |
| TY02 | 167 | 55 | |
| TY03 | 28 | 204 | |

⋮

Fig. 15
EXAMPLE OF OUTPUT OF TENDENCY INFORMATION (LIST FORMAT)

| VEHICLE NAME | SPOT ID | THE NUMBER OF VISITS |
|---|---|---|
| TY01 | LA11 | 387 |
| | LA12 | 250 |
| | | |
| TY02 | | |
| | | |

⋮

EXAMPLE OF OUTPUT OF TENDENCY INFORMATION
(TOTALING RESULTS OF THE NUMBER OF
VISITS FOR EACH VEHICLE NAME AT SPOT XX)

FIG. 18

EXAMPLE OF DATA STRUCTURE OF
VISIT SEQUENCE HISTORY INFORMATION DATABASE

| OCCURRENCE DATE | VEHICLE INFORMATION | | | | | |
|---|---|---|---|---|---|---|
| | VEHICLE ID | VEHICLE NAME | VEHICLE BODY STYLE | BODY COLOR | VEHICLE MODEL YEAR | RANK |
| | | | | | | |
| | | | | | | |

| VISIT SPOT INFORMATION | | | | | | | |
|---|---|---|---|---|---|---|---|
| VISIT SPOT #1 | | | | | | | VISIT SPOT #2 |
| SPOT ID | LARGE GENRE | MEDIUM GENRE | SMALL GENRE | POSITION INFORMATION | PRICE RANGE | | |
| | | | | | | | |
| | | | | | | | |

EXAMPLE OF DATA STRUCTURE OF
VEHICLE PROVISION INFORMATION DATABASE

| TIME STAMP | VEHICLE ID | VEHICLE TYPE | BODY COLOR | VEHICLE MODEL YEAR | POSITION INFORMATION | SPOT ID |
|---|---|---|---|---|---|---|
| YY:MM:DD1: TT1:MM:SS | V01 | | | | | LA01 |
| YY:MM:DD1: TT2:MM:SS | V01 | | | | | LA02 |
| | | | | | | |
| | | | | | | |
| | | | | | | |

EXTRACT

| OCCURRENCE DATE | VEHICLE ID | VEHICLE TYPE | BODY COLOR | VEHICLE MODEL YEAR | VISIT #1 SPOT ID | VISIT #2 SPOT ID |
|---|---|---|---|---|---|---|
| YY:MM:DD1 | V01 | | | | LA01 | LA02 |
| | | | | | | |

Fig. 20
EXAMPLE OF MOVEMENT TENDENCY INFORMATION

| VEHICLE NAME | VISIT #1 | VISIT #2 | THE NUMBER OF OCCURRENCES |
|---|---|---|---|
| TY01 | FRENCH CUISINE | CAFE | |
| TY01 | TAVERN | CHINESE NOODLES | |
| | | | |
| | | | |
| | | | |

INFORMATION PROCESSING APPARATUS, INFORMATION PROCESSING METHOD, AND NON-TRANSITORY STORAGE MEDIUM

CROSS REFERENCE TO THE RELATED APPLICATION

This application claims the benefit of Japanese Patent Application No. 2020-067916, filed on Apr. 3, 2020, which is hereby incorporated by reference herein in its entirety.

BACKGROUND

Technical Field

The present disclosure relates to an information processing apparatus, an information processing method, and a non-transitory storage medium.

Description of the Related Art

There is disclosed a privilege imparting device that acquires a post on an SNS (social networking service) by a specific user and a point included in the post, and outputs privilege based on an attribute of an image included in the post and the acquired point (for example, Japanese Patent Laid-Open No. 2019-121232).

CITATION LIST

Patent Document

[Patent Document 1] Japanese Patent Laid-Open No. 2019-121232

SUMMARY

One or more aspects of the disclosure are directed to provide an information processing apparatus capable of acquiring information indicating a tendency on a visit spot for each vehicle sort, an information processing method, and a storage medium non-temporarily storing a program.

One aspect of the present disclosure may be directed to an information processing apparatus including:
a controller including at least one processor configured to execute:
acquiring first information about a plurality of vehicles, the first information including vehicle information about a vehicle, the vehicle information not being capable of identifying an individual user or an individual vehicle but reflecting at least part of attributes or preferences of a user associated with the vehicle, and the first information including spot information about a visit spot of the vehicle; and
acquiring tendency information indicating a tendency on the visit spot of the vehicle for each vehicle classification based on the vehicle information, from the first information about the plurality of vehicles.

Another aspect of the present disclosure may be directed to an information processing method including:
acquiring first information about a plurality of vehicles, the first information including vehicle information about a vehicle, the vehicle information not being capable of identifying an individual user or an individual vehicle but reflecting at least part of attributes or preferences of a user associated with the vehicle, and the first information including spot information about a visit spot of the vehicle; and
acquiring tendency information indicating a tendency on the visit spot of the vehicle for each vehicle classification based on the vehicle information, from the first information about the plurality of vehicles.

Another aspect of the present disclosure may be directed to a storage medium non-temporarily storing a program for causing a computer to execute:
acquiring first information about a plurality of vehicles, the first information including vehicle information about a vehicle, the vehicle information not being capable of identifying an individual user or an individual vehicle but reflecting at least part of attributes or preferences of a user associated with the vehicle, and the first information including spot information about a visit spot of the vehicle; and
acquiring tendency information indicating a tendency on the visit spot of the vehicle for each vehicle classification based on the vehicle information, from the first information about the plurality of vehicles.

According to one aspect of the present disclosure, it is possible to acquire information indicating a tendency on a visit spot for each vehicle sort.

BRIEF DESCRIPTION OF THE DRAWINGS

FIG. 4 illustrates an example of a data structure of a vehicle information database;

FIG. 5 illustrates an example of a data structure of a spot information database;

FIG. 6 illustrates an example of a data structure of a camera information database;

FIG. 8 illustrates an example of a data structure of a vehicle provision information database;

FIG. 9 illustrates an example of a data structure of a camera provision information database;

FIG. 10 illustrates an example of a data structure of an SNS provision information database;

FIG. 11 is a diagram illustrating an example of a condition setting screen of an acquisition request for attribute information;

FIG. 12 illustrates an example of a flowchart of an acquisition process of visit history information of the center server;

FIG. 13 illustrates an example of a flowchart of a totaling process of the visit history information of the center server;

FIG. 14 is a diagram illustrating an example of an output of tendency information;

FIG. 15 is a diagram illustrating an example of an output of tendency information;

FIG. 18 illustrates an example of a data structure of a spot-to-spot movement history information database;

FIG. 20 illustrates an example of an output of movement tendency information.

DESCRIPTION OF THE EMBODIMENTS

Figure 1:
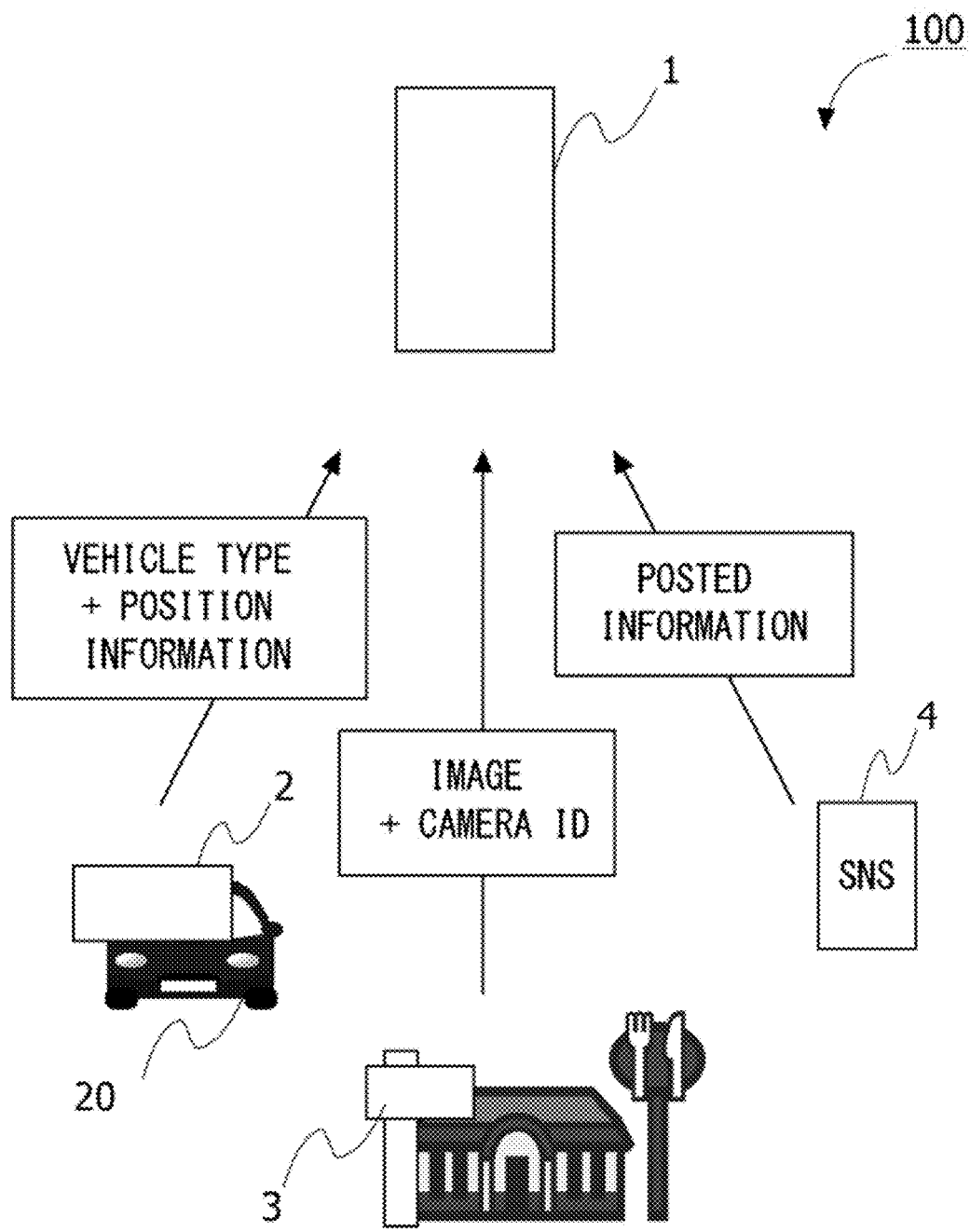
FIG. 1 is a diagram illustrating an example of a system configuration of a system according to a first embodiment.

For example, classes of purchasers of vehicles include respective characteristics depending on the vehicle names, vehicle body styles or the like of the vehicles. For example, the class of purchasers of the vehicles the names of which are classified as luxury vehicles tend to include a large number of so-called high net worth individuals. For example, the class of purchasers of the vehicles designed in style classified as a wagon vehicle tend to include a large number of families. That is, information about a vehicle such as the vehicle name or the style can be regarded as information reflecting a certain extent attributes of the vehicle purchaser or the like. The information about the vehicle includes, for example, a grade, a body color, a model year, and the like in addition to the vehicle name and the vehicle body style. An individual vehicle and an individual such as an owner of the vehicle cannot be identified by such information. Examples of the vehicle body style include a sedan, a wagon, a coupe, and a hatchback.

In addition, a different tendency is found among users in terms of use of stores, that is, for example, the users who are high net worth individuals frequently use high-end restaurants, and the users who are families frequently use restaurants for family. In view of such events, it is conceivable that a tendency is found in a visit spot for each classification based on the information about the vehicle.

One aspect of the present disclosure may be directed to an information processing apparatus that acquires a tendency on a visit spot of a vehicle for each classification based on information about the vehicle. More specifically, the information processing apparatus may include a controller. The controller may acquire first information about a plurality of vehicles, the first information including vehicle information about a vehicle, the vehicle information not being capable of identifying an individual user or an individual vehicle but reflecting at least part of attributes or preferences of a user associated with the vehicle, and the first information including spot information about a visit spot of the vehicle. Next, the controller may acquire tendency information indicating a tendency on the visit spot of the vehicle for each vehicle classification based on the vehicle information, from the first information about the plurality of vehicles.

The user associated with the vehicle is a purchaser, a driver or the like of the vehicle, for example. The vehicle information about the vehicle, which does not allow the individual user or the individual vehicle to be identified but reflects at least part of attributes or preferences of a user associated with the vehicle. The vehicle information about the vehicle includes a vehicle type, a vehicle body style, a vehicle name, a model, a grade, a body color, and a model year, for example. The vehicle type is identification information that is described in a vehicle inspection certificate and a caution plate, the information being used to identify the vehicle manufacturer, the vehicle name, and the model. Examples of the attributes of the user associated with the vehicle include fund power, a family structure, age, and gender.

Examples of information sources of the first information include an in-vehicle device mounted on vehicle, a camera installed at a position associated with a predetermined spot, and a post on an SNS.

According to one aspect of the present disclosure, it is possible to acquire a tendency on the visit spot of the vehicle for each classification based on the vehicle information about the vehicle, which does not allow the individual user or the individual vehicle to be identified but reflects at least part of attributes or preferences of a user associated with the vehicle. In addition, since the vehicle information is not the information allowing the individual user or the individual vehicle to be identified, the individual information of the user serving as an information provider is unlikely to be identified, whereby it is relatively easy to invite the information provider. Furthermore, since information which allows identification from appearance such as a vehicle name, a model, a vehicle body style, or a body color can be used as the vehicle information, a security camera of each store and the like can be also used as an information-providing source, for example, whereby the information can be collected widely.

In one aspect of the present disclosure, the vehicle information may include at least one piece of data classified as any one of a plurality of attributes associated with the vehicle information. The spot information may include at least one piece of data classified as any one of a plurality of attributes associated with the spot information. The controller may be configured to acquire the tendency information by totaling numbers of records of the first information about the plurality of vehicles according to at least one attribute of the plurality of attributes associated with the vehicle information and at least one attribute of the plurality of attributes associated with the spot information. Alternatively, the controller may be also configured to total numbers of records of the first information according to an attribute specified by a totaling condition including specification of the attribute used for the totaling.

The plurality of attributes associated with the vehicle information is two or more attributes among a vehicle name, a vehicle body style, a body color, a vehicle model year, and number of passengers, for example. The plurality of attributes associated with the spot information is two or more attributes among identification information of a spot, a position of a spot, and a genre of a spot, for example. Note that the attributes associated with the vehicle information and the attributes associated with the spot information are not limited to the above-described examples.

According to one aspect of the present disclosure, the tendency information to be acquired may change depending on the attributes used for the totaling. When, for example, the attribute "vehicle name" included in vehicle attribute information and the attribute "genre" included in spot attribute information may be used for the totaling, the number of pieces of the first information for each vehicle name and each spot genre is acquired as the tendency information. In this case, information for each vehicle name indicating what genre of a spot is frequently visited or information for each spot genre indicating what the vehicle name of a vehicle frequently visiting there is can be acquired from the tendency information.

For example, the vehicle type tends to reflect fund power, a family structure, age, gender, and the like of the purchaser of the vehicle. For example, the body color tends to reflect age, gender, or a preference on whether the user prefers modification of the vehicle. For example, the vehicle model year tends to reflect fund power of the user on whether the user has the fund power enough to replace the vehicle with a new model year vehicle, whether the user has the fund power enough to own a vintage vehicle. i.e., a rare vehicle, or the like. For example, it is conceivable that the number of passengers of the vehicle implies the family structure or socializing of the user, which affects the tendency on the genre of the visit spot. Therefore, according to one aspect of the present disclosure, the tendency information can be flexibly acquired from various angles according to the attributes used for the totaling of the first information.

In addition, in one aspect of the present disclosure, the controller may extract the first information used for the totaling according to an extraction condition. This makes it possible to limit the number of pieces of the first information used for the totaling, reduce a processing load of the information processing apparatus, and reduce time required for the process.

In addition, in one aspect of the present disclosure, the controller may be configured to output the tendency information in a format specified by an output condition for specifying an output format of the tendency information. Examples of the output format may include a totaling table, a list, a pie chart, and a band chart. Different output formats lead to difference in information to be conveyed intuitively. Therefore, according to one aspect of the present disclosure, one piece of tendency information can be output in a format according to a user's request.

In one aspect of the present disclosure, the first information may include time information about time. The time information may include at least one piece of data classified as any one of a plurality of attributes associated with the time information. The plurality of attributes associated with the time information may be two or more attributes among a date and time, a year, a month, a day of the week, a time slot, a season, and a staying time, for example. The controller may be configured to acquire the tendency information by totaling numbers of records of the first information about the plurality of vehicles according to at least one attribute of the plurality of attributes associated with the vehicle information, at least one attribute of the plurality of attributes associated with the spot information, and at least one attribute of the plurality of attributes associated with the time information.

By adding the attributes of the time information for the totaling, the tendency information can be acquired, reflecting time elements, for example, for each year, for each month, for each day of the week, for each time slot, for each season, or for each staying time.

In one aspect of the present disclosure, the controller may be configured to further execute indicating a history in which one vehicle has moved from a spot of a movement source to a spot of a movement destination based on the first information, and acquiring second information including the vehicle information about the one vehicle, and the spot information about each of the spots of the movement source and the movement destination. In this case, the controller may be configured to acquire, as the tendency information, information indicating a tendency for a vehicle to move between the two spots for each classification based on the vehicle information, from the second information about the plurality of vehicles. This makes it possible to acquire, for each vehicle name, the information indicating a tendency between a genre of the spot of the movement source and a genre of the spot of the movement destination, and use the acquired information for a service for proposing a spot which is likely to become a movement destination from a spot at which the vehicle is currently positioned based on the information indicating the tendency, for example.

Embodiments of the present disclosure will be described below with reference to the drawings. The configurations of the following embodiments are illustrative, and the present disclosure is not limited to the configurations of the embodiments.

First Embodiment

FIG. 1 is a diagram illustrating an example of a system configuration of a system 100 according to a first embodiment. The system 100 is a system that acquires tendency information indicating a tendency on a visit spot for each vehicle sort.

In the first embodiment, the vehicle sort is defined by any one or a combination of two or more of a vehicle name, a model (type), a grade, a vehicle body style, a body color, a model year, and a rank of the vehicle. Note that in the first embodiment, it is assumed that the vehicle sort is defined by the vehicle name. The vehicle name is also referred to as a pet name. In addition, in some cases, the vehicle name may be a combination of alphabets and numbers. Vehicles including the same vehicle name may be different in vehicle body style, model or grade.

In the first embodiment, examples of the spot include a store and a facility, which are also referred to as Points of Interest (POIs). In addition, the spot also includes a mountain, a river, a beach, a scenic spot, and the like.

The system 100 includes a center server 1, an in-vehicle device 2 mounted on a vehicle 20, a camera 3 installed at a predetermined spot, and an SNS server 4, for example. The center server 1 can communicate with the in-vehicle device 2, the camera 3, and the SNS server 4 through a public communication network such as the Internet, for example. Although a plurality of in-vehicle devices 2, a plurality of cameras 3, and a plurality of SNS servers 4 are included in the system 100, FIG. 1 illustrates one for each of them for the purpose of convenience. Note that owners or administrators of the in-vehicle device 2 and the camera 3 permit providing the information to the system 100. Examples of the camera 3 include a camera that is installed in each site of stores and facilities and whose capturing range is a parking lot in the site, a camera that is installed along a road and whose capturing range is a part of the road, and the like.

In the first embodiment, the center server 1 collects visit history information indicating a correspondence between vehicle information and visit spot information about a spot visited by the vehicle. The visit history information is an example of "first information."

The vehicle information is information about a vehicle that is not information allowing the individual vehicle and an individual associated with the vehicle to be identified while reflecting at least part of attributes or preferences of the individual associated with the vehicle. Examples of the individual associated with the vehicle include a purchaser and a driver of the vehicle. More specifically, the vehicle information includes a vehicle name, a model, a grade, a vehicle body style, a body color, a model year, and the like. Information such as a vehicle type indirectly indicating the vehicle name, the model, the grade, the vehicle body style, the body color, the model year, and the like can be also regarded as a type of the vehicle information. The vehicle type is identification information that is described in a vehicle inspection certificate and a caution plate. A vehicle manufacturer, a brand, a model, and the like can be identified from the vehicle type. The visit spot information includes a name, position information, a genre, and the like of the spot, for example. In addition, information allowing the spot to be identified can be regarded as a type of the visit spot information.

In the first embodiment, the in-vehicle device 2, the camera 3, and the SNS server 4 serve as information sources of the visit history information. The visit history information is collected in the following methods (1) to (3), for example.

(1) The center server 1 receives the vehicle type and the position information from the in-vehicle device 2 at a predetermined cycle. The vehicle type is one of the vehicle information. The position information allowing the spot to be identified is a type of the visit spot information.

(2) The center server 1 receives the camera ID and the captured image from the camera 3 at a predetermined cycle. In the case where the spot where the camera is installed can be identified from the camera ID, the camera ID can be regarded as one of the visit spot information. In the case where the captured image includes a vehicle, the vehicle name, vehicle body style, body color or the like of the vehicle can be identified, and therefore the captured image can be regarded as one of the vehicle information.

(3) The center server 1 acquires posted information posted on the SNS server 4. The posted information includes a message, or/and an image, for example. In addition, the posted information optionally includes the position information. In the case where the message or the image includes information allowing a vehicle name, a model, a grade, a vehicle body style, a body color, a model year, or the like to be identified, the posted information can be regarded as one of the vehicle information. In addition, in the case where the position information is included in the posted information, the posted information can be regarded as one of the visit spot information.

Since the correspondences between the vehicle information and the visit spot information that are acquired from the in-vehicle device 2, the camera 3, and the SNS server 4, respectively, include different information, the center server 1 reforms the information into a common format and acquires the visit history information.

Next, when receiving an input of an acquisition request for the tendency information, the center server 1 totals numbers of records of the visit history information according to at least one piece of specified information out of the vehicle information and at least one piece of specified information out of the visit spot information, and acquires totaling results as the tendency information. For example, in the case where the visit history information is totaled numbers of records of according to the vehicle name as one of the vehicle information and the genre as one of the visit spot information, the number of pieces of the visit history information for each vehicle name and each genre is acquired as the tendency information. The number of visit histories for each vehicle name and each genre indicates the number of times in which a vehicle including a vehicle name X (X: a variable of a vehicle name) visits a spot of a genre Y (Y: a variable of a genre) (referred to as the number of visits). By analyzing the tendency information, a relationship between the vehicle sort and the visit spot can be obtained; for example, a user associated with the vehicle including the vehicle name X highly tends to visit the spot of the genre Y.

Figure 2:
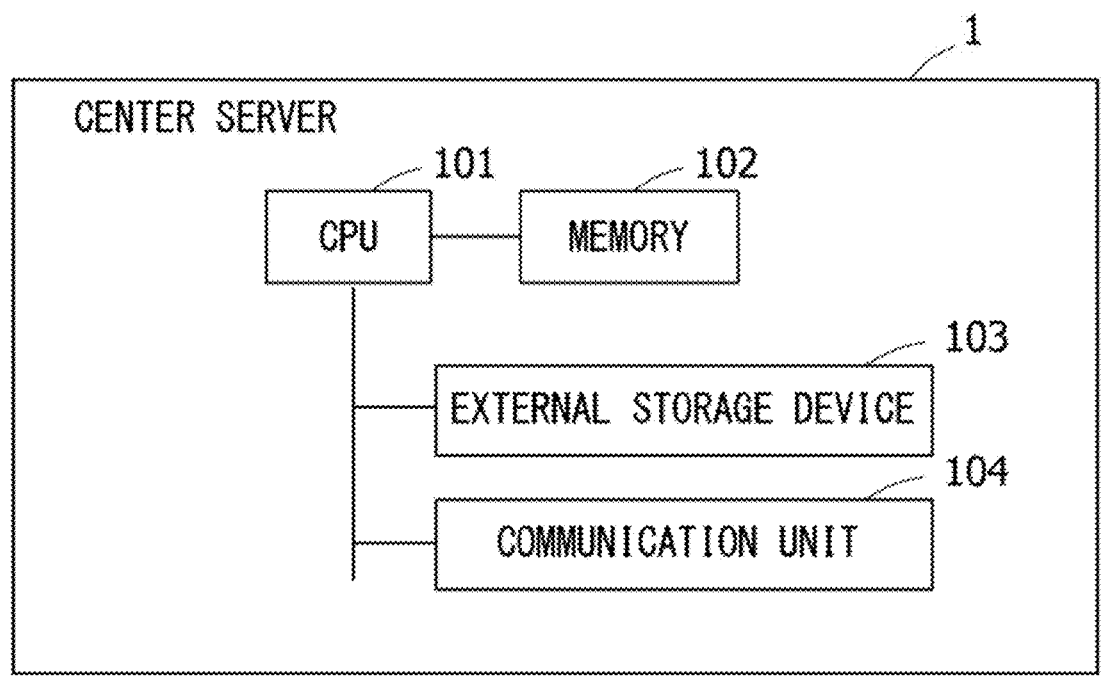
FIG. 2 is a diagram illustrating an example of a hardware configuration of a center server.

FIG. 2 is a diagram illustrating an example of a hardware configuration of the center server 1. The center server 1 includes a central processing unit (CPU) 101, a memory 102, an external storage device 103, and a communication unit 104 as the hardware configuration. The memory 102 and the external storage device 103 are computer-readable recording medium. The center server 1 is an example of the "information processing apparatus."

The external storage device 103 stores various programs, and data to be used by the CPU 101 at the time of execution of each program. The external storage device 103 is an erasable programmable ROM (EPROM) or a hard disk drive, for example. The programs to be held in the external storage device 103 include an operating system (OS), an information processing program, and other various application programs, for example. The information processing program is a program for acquiring information indicating a tendency on a visit spot according to the vehicle sort.

The memory 102 is a main memory that provides, to the CPU 101, a storage area and a work area for loading the programs stored in the external storage device 103, or that is used as a buffer. The memory 102 includes a semiconductor memory such as a read only memory (ROM) and a random access memory (RAM), for example.

The CPU 101 performs various processes by loading, into the memory 102, and executing, the OS and the various application programs that are held in the external storage device 103. The number of CPUs 101 is not limited to one, and a plurality of CPUs 101 may be provided. The CPU 101 is an example of the "controller" of the "information processing apparatus."

The communication unit 104 is an interface for performing input/output of information with the network. The communication unit 104 is an interface that is connected to a wired network such as a local area network (LAN) card, or an optical line card, for example. The communication unit 104 may be a wireless communication circuit that performs communication in a mobile communication system such as 5th generation (5G), long term evolution (LTE), or 3rd generation (3G), or based on wireless communication standards such as Wi-Fi (registered trademark), for example. Note that the hardware configuration of the center server 1 is not limited to that illustrated in FIG. 2. Additionally, like the center server 1, the in-vehicle device 2 and the camera 3 each include a CPU, a memory, an external storage device, and a communication unit. The communication unit of the in-vehicle device 2 performs wireless communication in a mobile communication system such as 5G, LTE, or 3G, or based on the wireless communication standards such as Wi-Fi (registered trademark) or dedicated short range communication (DSCR). The communication unit of the camera 3 may be a communication unit that performs wireless communication based on any one of the above-described wireless communication standards or may be a communication unit that is connected to a wired network such as LAN.

Figure 3:
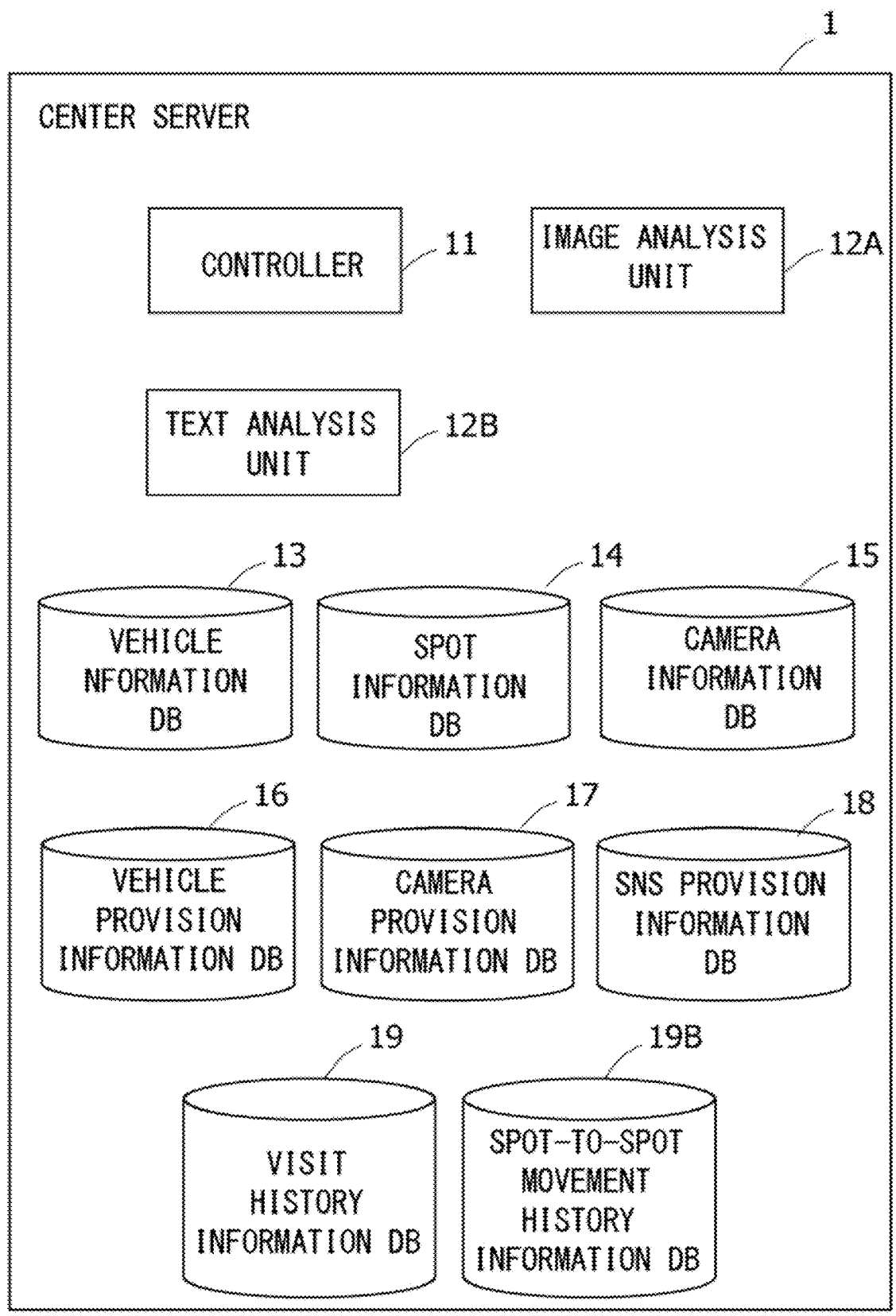
FIG. 3 is a diagram illustrating an example of a functional configuration of the center server.

FIG. 3 is a diagram illustrating an example of a functional configuration of the center server 1. The center server 1 includes, as functional components, a controller 11, an image analysis unit 12A, a text analysis unit 12B, a vehicle information DB 13, a spot information DB 14, a camera information DB 15, a vehicle provision information DB 16, a camera provision information DB 17, an SNS provision information DB 18, a visit history information DB 19, and a spot-to-spot movement history information DB 19B. These functional components are functional components implemented by the CPU 101 of the center server 1 executing the information processing program, for example. Note that since the spot-to-spot movement history information DB 19B is a functional component that functions in a modified example described later, description thereof is omitted in the first embodiment.

The controller 11 acquires and totals numbers of records of the visit history information. In an acquisition process of the visit history information, the controller 11 reforms provision information provided from each of the in-vehicle device 2, the camera 3, and the SNS server 4 into a predetermined format, and acquires the visit history information. In a totaling process of the visit history information, the controller 11 totals numbers of records of the visit history information according to at least one piece of information out of the vehicle information and at least one piece of information out of the visit history information, and acquires the tendency information as totaling results. Note that details of the acquisition and totaling processes of the visit history information will be described later.

The image analysis unit 12A performs image processing of a target image according to an instruction from the controller 11, detects a vehicle from the target image, and acquires a part of vehicle information about the detected vehicle. The part of the vehicle information acquired from the image includes the vehicle name, the model, or the body color, for example. However, the part of the vehicle information acquired from the image is not limited to the above-described examples.

The text analysis unit 12B analyzes target text data according to an instruction from the controller 11, and acquires a part of vehicle information or/and visit spot information. The part of the vehicle information acquired from the text data includes the vehicle name, the model, the grade, the vehicle body style, the model year, or the body color, for example. The part of the visit spot information acquired from the text data includes the name or address of the spot, for example. However, the part of the vehicle information and the part of the visit spot information that are acquired from the text data are not limited to the above-described examples.

Note that, for the image analysis by the image analysis unit 12A or the text analysis by the text analysis unit 12B, an engine, artificial intelligence (AI) or a machine learning model, or the like may be used to analyze the image or extract the text (particularly, POI), for example.

The vehicle information DB 13, the spot information DB 14, the camera information DB 15, the vehicle provision information DB 16, the camera provision information DB 17, the SNS provision information DB 18, and the visit history information DB 19 each are created in the storage area of the external storage device 103 of the center server 1, for example. The vehicle information DB 13 holds the information about a vehicle. The spot information DB 14 holds the information about a spot. The camera information DB 15 holds the information about the camera 3.

The vehicle provision information DB 16 holds the provision information received from the in-vehicle device 2. The camera provision information DB 17 holds the provision information received from the camera 3. The SNS provision information DB 18 holds the provision information acquired from the SNS server 4. The visit history information DB 19 holds the visit history information.

FIG. 4 illustrates an example of a data structure of the vehicle information DB 13. The data structure of the vehicle information DB 13 illustrated in FIG. 4 includes fields for a vehicle type, a manufacturer, a vehicle name, a model, a vehicle body style, and a luxury rank, for example.

The data indicating identification information of a vehicle type is stored in the field for the vehicle type. The data indicating a manufacturer name indicated by the vehicle type is stored in the field for the manufacturer. The data indicating a vehicle name indicated by the vehicle type is stored in the field for the vehicle name. The data indicating a model name indicated by the vehicle type is stored in the field for the model. The data indicating a vehicle body style indicated by the vehicle type is stored in the field for the vehicle body style. The data indicating a rank of a price range of a vehicle including a vehicle name indicated by the vehicle type is stored in the field for the luxury rank. For example, the luxury rank is expressed by numerical values of five ranks, and the larger the value is, the higher the rank is. Note that the luxury rank may be set originally by the system 100 based on public information or a sales price of each vehicle, for example, or may be set by a predetermined organization.

The data included in the vehicle information DB 13 is registered based on the public information of each vehicle manufacturer, for example. For example, in the case where a model or a vehicle body style is not indicated by the vehicle type, the field for the model or the vehicle body style may be blank or "Null" may be stored. Note that the data structure of the vehicle information DB 13 is not limited to that illustrated in FIG. 4.

FIG. 5 illustrates an example of a data structure of the spot information DB 14. The data structure of the spot information DB 14 illustrated in FIG. 5 includes fields for a spot ID, a spot name, a position, a large genre, a medium genre, a small genre, a price range, and a camera ID.

The data indicating identification information of a spot is stored in the field for the spot ID. The data indicating identification information of a name of the spot is stored in the field for the spot name. The data indicating position information of the spot is stored in the field for the position. The position information indicated by the data stored in the field for position includes latitude and longitude, or an address, for example.

The data indicating a name of a genre as which the spot is classified is stored in the field for each of the large genre, the medium genre, and the small genre. In the first embodiment, the genre of the spot is set to three groups including the large genre, the medium genre, and the small genre are set.

The large genre is the largest classification group. As the large genre, a restaurant, a store, an amusement facility, a living related facility or the like is set, for example. The medium genre is a genre describing one large genre in more detail. For example, a genre of cuisine such as Japanese cuisine, Italian cuisine, French cuisine, or Chinese cuisine which is a product of a restaurant is used for the medium genre describing, in mere detail, a restaurant which is classified as the large genre. The small genre is a genre describing one medium genre in more detail. As a small genre corresponding to Japanese cuisine of the medium genre, Kaiseki cuisine, Robata cuisine, Sushi, set meal, or the like is set, for example.

The data indicating a price range of a product or service provided at the spot is stored in the field for the price range. For example, the price range is set to levels of three ranks including "high," "medium," and "low," and the data indicating any one of the levels is stored in the field for the price range. The levels of the price range may be set originally by the system 100 based on the public information, for example.

The data indicating identification information of the camera 3 associated with the spot is stored in the field for the camera ID, the camera 3 being installed in a site of the spot, in a parking lot related to the spot, or in the vicinity of the spot. In the case where there is a plurality of cameras 3 associated with the spot, the fields for the camera ID may be prepared for the number of cameras 3 associated with the spot.

The data held in the spot information DB 14 is registered in the case where a spot is newly registered with the system 100, for example. Note that the data structure of the spot information DB 14 is not limited to the example illustrated in FIG. 5.

FIG. 6 illustrates an example of a data structure of the camera information DB 15. The data structure of the camera information DB 15 illustrated in FIG. 6 includes fields for a camera ID, a position, and a spot ID.

The data indicating the identification information of the camera 3 is stored in the field for the camera ID. The data indicating position information of a position where the camera 3 is located is stored in the field for the position. The position information indicated by the data in the field for the position includes latitude and longitude, for example. The data indicating identification information of the spot associated with the camera 3 is stored in the field for the spot ID.

The data held in the camera information DB 15 is registered in the case where the camera 3 is registered with the system 100, for example. Note that the data structure of the camera information DB 15 is not limited to the example illustrated in FIG. 6.

Acquisition Process of Visit History Information

Hereinafter, the data structure of each database illustrated in FIGS. 7 to 10 will be described, and details of the acquisition process of the visit history information will be described.

Figure 7:
FIG. 7 illustrates an example of a data structure of a visit history information database.

FIG. 7 illustrates an example of a data structure of the visit history information DB 19. The data structure of the visit history information DB 19 includes fields for a time stamp, vehicle information, and visit spot information. One record in the visit history information DB 19 corresponds to one piece of visit history information.

The data indicating a time stamp included in the provision information serving as a source of the visit history information is stored in the field for the time stamp. For example, in the case where the visit history information is acquired from the provision information provided from the in-vehicle device 2, the data stored in the field for the time stamp indicates a date and time when the position information received from the in-vehicle device 2 is acquired. For example, in the case where the visit history information is acquired from the provision information provided from the camera 3, the data stored in the field for the time stamp indicates a date and time when an image received from the camera 3 is acquired. For example, in the case where the visit history information is acquired from the provision information provided from the SNS server 4, the data stored in the field for the time stamp indicates a date and time when the posted information is uploaded by the SNS server. The time stamp includes year, month, date, hour, minute, and second, for example.

The field for the vehicle information includes subfields for a vehicle name, a vehicle body style, a body color, a vehicle model year, and a luxury rank. The field for the visit spot information includes subfields for a spot ID, a large genre, a medium genre, a small genre, a position, and a price range. Data to be stored in each of these subfields is data indicating information that is the same as the information stored in the field including the same name in the data structure in each of the above-described databases. However, the position information corresponding to the spot indicated by the spot ID is stored in the subfield for the position of the visit spot information. In addition, the data to be stored in each of these subfields is acquired based on the provision information serving as a source of the visit history information. Note that regarding a subfield in which a value is not specified, the subfield may be blank or "Null" may be stored. Note that the data structure of the visit history information DB 19 is not limited to the example illustrated in FIG. 7.

FIG. 8 illustrates an example of a data structure of the vehicle provision information DB 16. The vehicle provision information DB 16 stores the provision information provided by the in-vehicle device 2. The provision information from the in-vehicle device 2 includes, the time stamp, at least one of the identification information of a vehicle, vehicle type, body color, vehicle body style and model year of the vehicle 20 on which the in-vehicle device 2 is mounted, and the position information of the vehicle 20 on which the in-vehicle device 2 is mounted. The identification information of the vehicle 20 is identification information used to identify the vehicle 20 in the system 100. The identification information of the vehicle 20 may be assigned without being associated with the information allowing the individual vehicle 20 to be identified and the information allowing the individual user associated with the vehicle 20 to be identified, or an individual identification number which is marked on a number plate or license plate may be used for the identification information of the vehicle 20.

The vehicle provision information DB 16 illustrated in FIG. 8 includes a vehicle ID, a time stamp, a vehicle type, a body color, a model year, and position information. The data indicating a time stamp included in the provision information from the in-vehicle device 2 is stored in the field for the time stamp, for example. The date and time indicated by the time stamp included in the provision information from the in-vehicle device 2 is, for example, a date and time when the position information of the vehicle 20 included in the provision information is acquired by the in-vehicle device 2.

The data indicating the identification information of the vehicle 20 is stored in the field for the vehicle ID, the identification information being included in the provision information from the in-vehicle device 2. The data indicating a vehicle type included in the provision information from the in-vehicle device 2 is stored in the field for the vehicle type. The data indicating a body color included in the provision information from the in-vehicle device 2 is stored in the field for the body color. The data indicating a vehicle model year included in the provision information from the in-vehicle device 2 is stored in the field for the vehicle model year. The data indicating position information included in the provision information from the in-vehicle device 2 is stored in the field for the position information. The position information of the vehicle 20 on which the in-vehicle device 2 is mounted is indicated by latitude and longitude acquired from a global positioning system (GPS) receiver which is provided in the in-vehicle device 2 or the vehicle 20, for example.

Note that it is only required that the data in at least one of the fields for the vehicle name, the body color, and the vehicle model year is acquired. In the case where the data corresponding to the field for the vehicle type, the body color or the vehicle model year is not included in the provision information from the in-vehicle device 2, such a field may be blank or "Null" may be stored. Note that the data structure of the vehicle provision information DB 16 is not limited to the example illustrated in FIG. 8.

The registration of a record to the vehicle provision information DB 16 is as follows, for example. The controller 11 receives the provision information from the in-vehicle device 2 at a predetermined cycle, for example. The cycle at which the in-vehicle device 2 transmits the provision information is set arbitrarily within a range of 1 to 10 minutes, for example. The controller 11 determines, with reference to the spot information DB 14, whether the position information included in the provision information indicates the spot registered with the spot information DB 14. In the case where the position information included in the provision information does not indicate any spot registered with the spot information DB 14, the controller 11 discards such provision information.

In the case where the position information included in the provision information indicates the spot registered with the spot information DB 14, the controller 11 specifies the latest record among records in the vehicle provision information DB 16 in which the value of the data in the field for the vehicle ID coincides with the identification information of the vehicle 20 included in the provision information. In the case where the spot indicated by the data in the field for the position information of the specified latest record coincides with the information indicated by the position information included in the received provision information, the controller 11 discards the received provision information. In this way, the provision information from the in-vehicle device 2 to be registered with the vehicle provision information DB 16 can be limited only to the provision information including a change in the spot indicated by the position information of the vehicle 20.

Next, the registration of a record to the visit history information DB 19 from the record in the vehicle provision information DB 16 is as follows, for example. For example, when the data structure of the visit history information DB 19 illustrated in FIG. 7 is compared with the data structure of the vehicle provision information DB 16 illustrated in FIG. 8, the two data structures do not coincide with each other. For example, the data structure of the vehicle provision information DB 16 illustrated in FIG. 8 does not include the fields for the vehicle name, the vehicle body style, the luxury rank, the spot ID, the large genre, the medium genre, the small genre, the position, and the price range, whereas the data structure of the visit history information DB 19 illustrated in FIG. 7 includes them. However, a part or all of the data in these insufficient fields can be acquired from the other databases such as the vehicle information DB 13 and the spot information DB 14. Then, the controller 11 acquires a part or all of the insufficient data in the provision information from the in-vehicle device 2 from the other databases, adds the acquired data to the data obtained from the record in the vehicle provision information DB 16, acquires the visit history information, and registers it with the visit history information DB 19.

For example, in the case where the data in the field for the vehicle type is acquired about the record in the vehicle provision information DB 16, the controller 11 acquires, from the vehicle information DB 13, the data in the field for each of the vehicle name, the vehicle body style, and the luxury rank, of the record in which the data in the field for the vehicle type matches the data in the field for the vehicle type of the record in the vehicle provision information DB 16. In addition, since the data in the field for the position information is acquired about the record in the vehicle provision information DB 16, the controller 11 acquires, from the spot information DB 14, the data in the field for each of the spot ID, the large genre, the medium genre, the small genre, the position, and the price range of the record that matches the spot indicated by the data in the field for the position information of the record in the vehicle provision information DB 16. In this way, the data can be acquired about the insufficient field for each of the vehicle name, the vehicle body style, the luxury rank, the spot ID, the large genre, the medium genre, the small genre, the position, and the price range in the data structure of the vehicle provision information DB 16 illustrated in FIG. 8.

The controller 11 combines the acquired data with the data acquired from the record in the vehicle provision information DB 16, and rearranges the data according to the data structure of the visit history information DB 19, to thereby acquire the visit history information. The acquired visit history information is stored in the visit history information DB 19. As described above, adding, deleting, replacing or rearranging the data with respect to the record in one database according to the data structure of another database is referred to as "formatting data" or "formatting of data."

FIG. 9 illustrates an example of a data structure of the camera provision information DB 17. The camera provision information DB 17 stores the provision information provided by the camera 3. The provision information from the camera 3 includes a time stamp, a camera ID of the camera 3, and a captured image of the camera 3, for example. The data structure of the camera provision information DB 17 illustrated in FIG. 9 includes fields for a time stamp, a camera ID, a vehicle name, a vehicle body style, and a body color.

The data indicating a time stamp included in the provision information from the camera 3 is stored in the field for the time stamp. The date and time indicated by the time stamp included in the provision information from the camera 3 is, for example, a date and time when the captured image is acquired by the camera 3. The data indicating a camera ID included in the provision information from the camera 3 is stored in the field for the camera ID.

The data indicating each of a vehicle name, a vehicle body style, and a body color of a vehicle is stored in the corresponding field for each of the vehicle name, the vehicle body style, and the body color, the vehicle being detected by image analysis from the captured image of the camera 3. Note that it is only required that the data in at least one of the fields for the vehicle name, the vehicle body style, and the body color is acquired. In the case where a field in which the data is not acquired exists among the fields for the vehicle name, the vehicle body style, and the body color, such a field may be blank or "Null" may be stored. In the case where a plurality of vehicles is extracted from one captured image included in one piece of provision information from the camera 3, a record for each of the extracted vehicles is created in and registered with the camera provision information DB 17. Note that the data structure of the camera provision information DB 17 is not limited to the example illustrated in FIG. 9.

The registration of a record to the camera provision information DB 17 is as follows, for example. The controller 11 receives the provision information from the camera 3 at a predetermined cycle, for example. The cycle at which the camera 3 transmits the provision information is set arbitrarily within a range of 1 to 10 minutes, for example. The controller 11 instructs the image analysis unit 12A to perform image analysis on the captured image included in the provision information from the camera 3. In the case where, as a result of the image analysis by the image analysis unit 12A, a vehicle is detected from the captured image included in the provision information from the camera 3, the controller 11 stores such provision information in the camera provision information DB 17. In the case where a vehicle is not detected from the captured image included in the provision information from the camera 3, the controller 11 discards such provision information.

Next, the registration of a record to the visit history information DB 19 from the record in the camera provision information DB 17 is as follows, for example. For example, when the data structure of the visit history information DB 19 illustrated in FIG. 7 is compared with the data structure of the camera provision information DB 17 illustrated in FIG. 9, the two data structures do not coincide with each other. For example, the data structure of the camera provision information DB 17 illustrated in FIG. 9 does not include the fields for the vehicle model year, the luxury rank, the spot ID, the large genre, the medium genre, the small genre, the position, and the price range, whereas the data structure of the visit history information DB 19 illustrated in FIG. 7 includes them. The controller 11 acquires a part or all of the insufficient data in the provision information from the camera 3, with reference to the vehicle information DB 13, the spot information DB 14, and the camera information DB 15.

For example, since the data in the field for the camera ID is acquired about the record in the camera provision information DB 17, the controller 11 acquires, with reference to the camera information DB 15, the data in the field for the spot ID of the record in which the data in the field for the camera ID matches the data in the field for the camera ID of the record in the camera provision information DB 17. Next, the controller 11 acquires, with reference to the spot information DB 14, the data in the field for each of the spot ID, the large genre, the medium genre, the small genre, the position, and the price range, of the record in which the data in the field for the spot ID matches the acquired data indicating the spot ID.

Furthermore, in the case where the data in the field for the vehicle name is acquired about the record in the camera provision information DB 17, the controller 11 acquires, with reference to the vehicle information DB 13, the data in the field for the luxury rank of the record in which the data in the field for the vehicle name matches the data in the field for the vehicle name of the record in the camera provision information DB 17. In the first embodiment, since the luxury rank is set corresponding to the vehicle name, even in the case where the vehicle information DB 13 includes a plurality of records each in which the data in the field for the vehicle name matches the data indicating one vehicle name, the data in the field for the luxury rank includes the same value among the plurality of records.

The controller 11 combines the acquired data with the data acquired from the record in the camera provision information DB 17, reforms the combined data according to the data structure of the visit history information DB 19, and acquires the visit history information. The acquired visit history information is stored in the visit history information DB 19.

For example, the data structure of the camera provision information DB 17 illustrated in FIG. 9 does not include the field for the vehicle model year whereas the data structure of the visit history information DB 19 illustrated in FIG. 7 includes it. However, it is difficult to identify the vehicle model year from the captured image, and to acquire the model year even by using the information about the vehicle acquired from the vehicle information DB 13 and the captured image. In such a case, the visit history information needs not to include the vehicle model year.

FIG. 10 illustrates an example of a data structure of the SNS provision information DB 18. The SNS provision information DB 18 holds the provision information provided from the SNS server 4. The provision information from the SNS server 4 includes a time stamp, identification information of an SNS server, identification information of a post, and posted information, for example. The posted information is information about a post that is uploaded from a user terminal to the SNS server 4 and published in an account page of each user on the web site. The posted information includes a message and/or an image, for example. The message also includes a hashtag, for example. The posted information may optionally include the position information. Furthermore, the posted information may include audio data or video data.

The SNS provision information DB 18 illustrated in FIG. 10 includes fields for a time stamp, an SNS ID, a post ID, a vehicle name, a vehicle body style, a body color, a position, and a spot ID.

The data indicating a time stamp included in the provision information from the SNS server 4 is stored in the field for the time stamp. The date and time indicated by the time stamp included in the provision information from the SNS server 4 is, for example, a date and time when the posted information is uploaded from the user terminal to the SNS server 4. The data indicating identification information of the SNS server 4 included in the provision information from the SNS server 4 is stored in the field for the SNS ID. The data indicating identification information of a post included in the provision information from the SNS server 4 is stored in the field for the post ID.

The data indicating each of a vehicle name, a vehicle body style, and a body color of a vehicle is stored in the corresponding field for each of the vehicle name, the vehicle body style, and the body color, the vehicle being extracted by image analysis or massage analysis from the posted information included in the provision information from the SNS server 4. Note that it is only required that the data in at least one of the fields for the vehicle name, the vehicle body style, and the body color is acquired. In the case where a field in which the data is not acquired exists among the fields for the vehicle name, the vehicle body style, and the body color, such a field may be blank or "Null" may be stored.

The data indicating position information acquired from the provision information provided from the SNS server 4 is stored in the field for the position information. The position information acquired from the provision information provided from the SNS server 4 is position information included in the provision information from the SNS server 4 or information indicating a position extracted from the posted information included in the provision information from the SNS server 4.

The position information included in the provision information from the SNS server 4 is, for example, position information acquired when the user terminal uploads the posted information to the SNS server 4. The position information included in the provision information from the SNS server 4 includes latitude and longitude, or an address, for example. The information indicating a position extracted from the posted information included in the provision information from the SNS server 4 includes a word indicating a POI and an address, for example. In the case where the position information is included in the provision information from the SNS server 4 and the information indicating the position is extracted from the posted information, the controller 11 stores the data indicating the position information included in the provision information from the SNS server 4 in the field for the position, for example. However, the present disclosure is not limited thereto.

The data indicating identification information of the spot registered with the spot information DB 14 is stored in the field for the spot ID, the spot being indicated by the data in the field for the position. Note that in the case where the information about a plurality of vehicles or the position information indicating a plurality of different spots or the POIs are extracted from one piece of posted information, the number of records to be created is the same as the number of detected vehicles or spots. In the case where a plurality of vehicles or the position information indicating a plurality of different spots or the POIs are extracted from one piece of posted information, the number of records to be created is the same as the number of combinations of the detected vehicles and spots. Note that the data structure of the SNS provision information DB 18 is not limited to the example illustrated in FIG. 10.

The registration of a record to the SNS provision information DB 18 is as follows, for example. The controller 11 acquires the provision information for a predetermined time period from the SNS server 4 at a predetermined timing, for example. The timing at which the controller 11 acquires the provision information from the SNS server 4 is set arbitrarily to a frequency of once a day, once a week, or once a month, for example. The time period during which the provision information is acquired is set to a day, a week, or a month according to the timing at which the controller 11 acquires the provision information from the SNS server 4.

The controller 11 acquires a text analysis result for a message included in the posted information and/or an image analysis result for an image included in the posted information, for each piece of provision information from the SNS server 4. The text analysis for the message included in the posted information is performed by the text analysis unit 128. The image analysis for the image included in the posted information is performed by the image analysis unit 12A. The information about a vehicle extracted as a result of the text analysis or the image analysis for the posted information includes a vehicle name, a vehicle body style, or a body color, for example. In addition, the information about a position extracted as a result of the text analysis or the image analysis for the posted information includes a word indicating a POI and an address, for example.

In the case where the provision information includes posted information from which the information about the vehicle is not extracted as a result of the message analysis or/and the image analysis for the posted information, the controller 11 discards such provision information. In addition, even in the case where the position information is not included in the provision information from the SNS server 4 and the provision information includes the posted information from which the position information is not extracted as a result of the message analysis or/and the image analysis for the posted information, the controller 11 discards such provision information. That is, in the case where both of the information about a vehicle and the information about a position are not acquired from the provision information from the SNS server 4, the controller 11 discards such provision information.

Furthermore, for the provision information from the SNS server 4 from which both of the information about the vehicle and the information about the position are acquired, the controller 11 determines whether a spot indicated by the information about the position is registered with the spot information DB 14. In the case where the information indicating the POI is extracted as the information indicating the position from the message of the posted information, the controller 11 acquires latitude and longitude, or an address corresponding to the POI from the POI database and searches the spot information DB 14 using the acquired latitude and longitude or address.

In the case where the spot indicated by the information about the position that is acquired together with the information about the vehicle from the provision information provided from the SNS server 4 is the spot registered with the spot information DB 14, the controller 11 creates a record in the SNS provision information DB 18, for such provision information. At this time, the controller 11 acquires the data in the field for the spot ID of the record corresponding to the information about the position, and stores it in the field for the spot ID of the corresponding record in the SNS provision information DB 18.

Next, the registration of a record to the visit history information DB 19 from the record in the SNS provision information DB 18 is as follows, for example. For example, when the data structure of the visit history information DB 19 illustrated in FIG. 7 is compared with the data structure of the SNS provision information DB 18 illustrated in FIG. 10, the two data structures do not coincide with each other. For example, the data structure of the SNS provision information DB 18 illustrated in FIG. 10 does not include the fields for the vehicle model year, the luxury rank, the spot ID, the large genre, the medium genre, the small genre, the position, and the price range, whereas the data structure of the visit history information DB 19 illustrated in FIG. 7 includes them. The controller 11 acquires a part or all of the insufficient data in the SNS provision information DB 18, with reference to the vehicle information DB 13 and the spot information DB 14.

For example, in the case where the data in the field for the vehicle name is acquired about the record in the SNS provision information DB 18, the controller 11 acquires, from the vehicle information DB 13, the data in the field for the luxury rank of the record in which the data in the field for the vehicle name matches the data in the field for the vehicle name of the record in vehicle information DB 13. In addition, since the data in the field for the spot ID is acquired about the record in the SNS provision information DB 18, the controller 11 acquires, from the spot information DB 14, the data in the field for each of the spot ID, the large genre, the medium genre, the small genre, the position, and the price range of the record in which the data in the field for the spot ID in the spot information DB 14 matches the data in the field for the spot ID in the SNS provision information DB 18. In this way, the data can be acquired about the insufficient field for each of the luxury rank, the spot ID, the large genre, the large genre, the medium genre, the small genre, the position, and the price range in the data structure of the SNS provision information DB 18 illustrated in FIG. 10.

The controller 11 combines the acquired data with the data included in the record in the SNS provision information DB 18, reforms the combined data according to the data structure of the visit history information DB 19, and acquires the visit history information. The acquired visit history information is stored in the visit history information DB 19. Note that it is difficult to identify the vehicle model year from the message or image included in the posted information, in the same way as the provision information from the camera 3, and therefore the vehicle model year needs not to be acquired.

The record in each database storing the provision information acquired from each information source illustrated in FIGS. 8 to 10 may be deleted at a predetermined timing, for example. The predetermined timing is, for example, a timing at which the registration of the record to the visit history information DB 19 is completed, or a timing at which a predetermined time period of a relatively long span such as one year or longer has elapsed.

Totaling Process of Visit History Information

The controller 11 receives an input of an acquisition request for the tendency information by an input received from another device or an input of user operation. When receiving the input of the acquisition request for the tendency information, the controller 11 totals numbers of records of the visit history information according to one piece of information out of the vehicle information and one piece of information out of the visit spot information, and acquires totaling results as the tendency information. That is, the controller 11, about the visit history information to be stored in the visit history information DB 19, performs cross totaling or multiplex cross totaling according to at least two attributes including at least one piece of information out of the vehicle information and at least one piece of information out of the visit spot information. Hereinafter, the cross totaling and the multiplex cross totaling are collectively referred to as cross totaling.

The cross totaling means totaling numbers of the data matching a cross between at least two attributes. The totaling in which three or more attributes are crossed is referred to as multiplex cross totaling. In the first embodiment, the attributes include each information included in the vehicle information and each information included in the visit spot information. In the case where the data structure of the visit history information DB 19 is as in the example illustrated in FIG. 7, the attributes included in the vehicle information are a vehicle name, a vehicle body style, a body color, a vehicle model year, and a luxury rank. The attributes included in the visit spot information are a spot ID, a large genre, a medium genre, a small genre, a position and a price range. A unique value of the attribute is referred to as a category. For example, each of unique names such as vehicle name A, vehicle name B, . . . , is a category in the attribute "vehicle name." In the visit history information DB 19, it is one of the attributes for the time stamp. For the totaling process of the visit history information, a function, an application, or the like for performing the cross totaling may be used, for example.

In the first embodiment, the controller 11 receives inputs of three conditions including the extraction condition, the totaling condition, and the output condition, together with the acquisition request for the tendency information. Since the number of pieces of the visit history information in the visit history information DB 19 is enormous, it is necessary to narrow down the visit history information used for the totaling. The extraction condition is a condition for narrowing down the visit history information used for the totaling. The extraction condition may specify any of categories in each attribute included in the visit history information DB 19. More specifically, the extraction condition may specify one or more of a time period, each attribute and each category of the vehicle information, and each attribute and each category of the visit history information. In the case where, for example, the information about vehicle A in the most recent one-year period is desired, the extraction condition includes two pieces of condition information in which the category of the attribute "time stamp" is within the most recent one-year period and the category of the attribute "vehicle name" is vehicle A.

The totaling condition is a condition for specifying the attributes used for the cross totaling. In the first embodiment, since the tendency information is information indicating a tendency on a visit spot for each vehicle sort, it is necessary to select at least one attribute from each of the attributes included in the vehicle information and the attributes included in the visit spot information. Accordingly, in the totaling condition, at least one attribute included in the vehicle information and at least one attribute included in the visit spot information are specified as the attributes used for the cross totaling. In the case where, for example, the totaling for each spot visited by each vehicle name is desired, the totaling condition includes the attribute "vehicle name" included in the vehicle information and the attribute "spot ID" included in the visit spot information.

The output condition is a condition for specifying an output format indicating the totaling results. Examples of the output format include a totaling table, a bar graph, a pie chart, a band chart, a display on a map, and a list.

FIG. 11 is a diagram illustrating an example of a condition setting screen of an acquisition request for the attribute information. The condition setting screen of the acquisition request for the attribute information is a screen displayed when an instruction to transmit the acquisition request for the attribution information is input, in the user terminal or a display on an operation terminal of the center server 1. On the condition setting screen of the acquisition request for the attribution information, the extraction condition, the totaling condition, and the output condition can be set.

In the example illustrated in FIG. 11, a button 1100 is displayed on a lower part of the screen, the button 1100 being used to input an instruction of the acquisition request for the attribute information and change to a display screen of the attribute information. The button 1100 is set to be displayed when a predetermined condition is satisfied, for example.

In the example illustrated in FIG. 11, to set the extraction condition, pull-down menus and input columns are arranged to allow specification of the time period, the attribute and category included in the vehicle information and the attribute and category included in the visit spot information. For example, when none of the time period, the attribute and category included in the vehicle information, and the attribute and category included in the visit spot information is selected as the extraction condition, the button 1100 is not displayed, which makes it impossible to transmit the instruction of the acquisition request for the attribute information.

In the example illustrated in FIG. 11, to set the totaling condition, pull-down menus are arranged to allow specification of the attribute included in the vehicle information and the attribute included in the visit spot information. For example, when none of at least one of the attributes included in the vehicle information, and at least one of the attributes included in the visit spot information is selected as the totaling condition, the button 1100 is not displayed, which makes it impossible to transmit the instruction of the acquisition request for the attribute information.

In the example illustrated in FIG. 11, to set the output condition, a pull-down menu is arranged to allow specification of the output format. The output condition needs not to be specified, for example. In the case where the output condition is not specified, the tendency information is output in a format specified by default, for example.

Process Flow

FIG. 12 illustrates an example of a flowchart of the acquisition process of the visit history information of the center server 1. The process illustrated in FIG. 12 is started at a predetermined timing or by an input of an instruction to start the analysis process from an administrator, for example. The timing at which the process illustrated in FIG. 12 is started may be a timing at which the provision information is received from or acquired by any one of the in-vehicle device 2, the camera 3, and the SNS server 4, or a set date and time such as once a day, once a week, or once a month, for example. Any one of a real-time process and a batch process may be performed for the visit history information. An entity that performs the process illustrated in FIG. 12 is the CPU 101, but a functional component is described as the entity for the purpose of convenience. Note that this will similarly apply to description of the following flowcharts of processes performed by the center server 1.

In OP101, the controller 11 acquires the provision information. In the case of the real-time process, the provision information received from the in-vehicle device 2, the camera 3, or the SNS server 4 is acquired as it is. In the case of the batch process, the controller 11 reads and acquires the provision information included in the time period after the completion of the previous process until the start of the present process, from the vehicle provision information DB 16, the camera provision information DB 17, and the SNS provision information DB 18.

In OP102, the controller 11 reforms the above-described data to acquire visit history information from the acquired provision information. In OP103, the controller 11 stores the acquired visit history information in the visit history information DB 19. Then, the process illustrated in FIG. 12 ends.

FIG. 13 illustrates an example of a flowchart of the totaling process of the visit history information of the center server 1. The process illustrated in FIG. 13 is performed repeatedly during the operation of the center server 1.

In OP201, the controller 11 determined whether an acquisition request for the tendency information is input. The extraction condition, the totaling condition, and the output condition are received together with the acquisition request for the tendency information. When the acquisition request for the attribute information is input (OP201: YES), the process proceeds to OP202. When the acquisition request for the attribute information is not received (OP201: NO), the process illustrated in FIG. 13 ends.

In OP202, the controller 11 extracts the visit history information to be totaled numbers of records of, from the visit history information DB 19, according to the received extraction condition. In OP203, the controller 11 performs cross totaling for the extracted visit history information, according to at least one of the attributes included in the vehicle information and at least one of the attributes included in the visit history information, which are specified by the received totaling condition.

In OP204, the controller 11 creates the tendency information in an output format specified by the received output condition. In OP205, the controller 11 outputs the tendency information. The tendency information is transmitted to the user terminal which is a transmission source of the acquisition request for the tendency information, or is displayed on the operation terminal of the center server 1, for example. Then, the process illustrated in FIG. 13 ends.

Note that the process of the center server 1 illustrated in each of FIGS. 12 and 13 is an example, and the process of the center server 1 is not limited thereto.

Output Example of Tendency Information about Visit Spot for Each Vehicle Sort

FIG. 14 is a diagram illustrating an example of an output of the tendency information. FIG. 14 illustrates an example of an output of the tendency information when the predetermined time period, the attribute "vehicle name" and the attribute "spot ID," and the cross-totaling format are specified as the extraction condition, the totaling condition, and the output condition, respectively. That is, the output of the tendency information illustrated in FIG. 14 indicates the number of pieces of visit history information for each vehicle name and each spot ID (the number of visits of the vehicle). More specifically, one piece of data corresponding to the category of the vehicle name and the category of the spot ID indicates the number of times in which the vehicle including the vehicle name indicated by the category visits the spot indicated by the category of the spot ID. This indicates that the larger the value in each field is, the higher the tendency for the vehicle including the vehicle name of the category to visit the spot of the category is.

FIG. 15 is a diagram illustrating an example of an output of the tendency information. FIG. 15 is an example of an output of the tendency information when the extraction condition and the totaling condition are the same as the example illustrated in FIG. 14, and a list format is specified as the output condition. In the case of the list format, the number of visits may be sorted in descending order or in ascending order for each vehicle name and each spot, for example. The sort condition can be also specified by the user.

Figure 16:
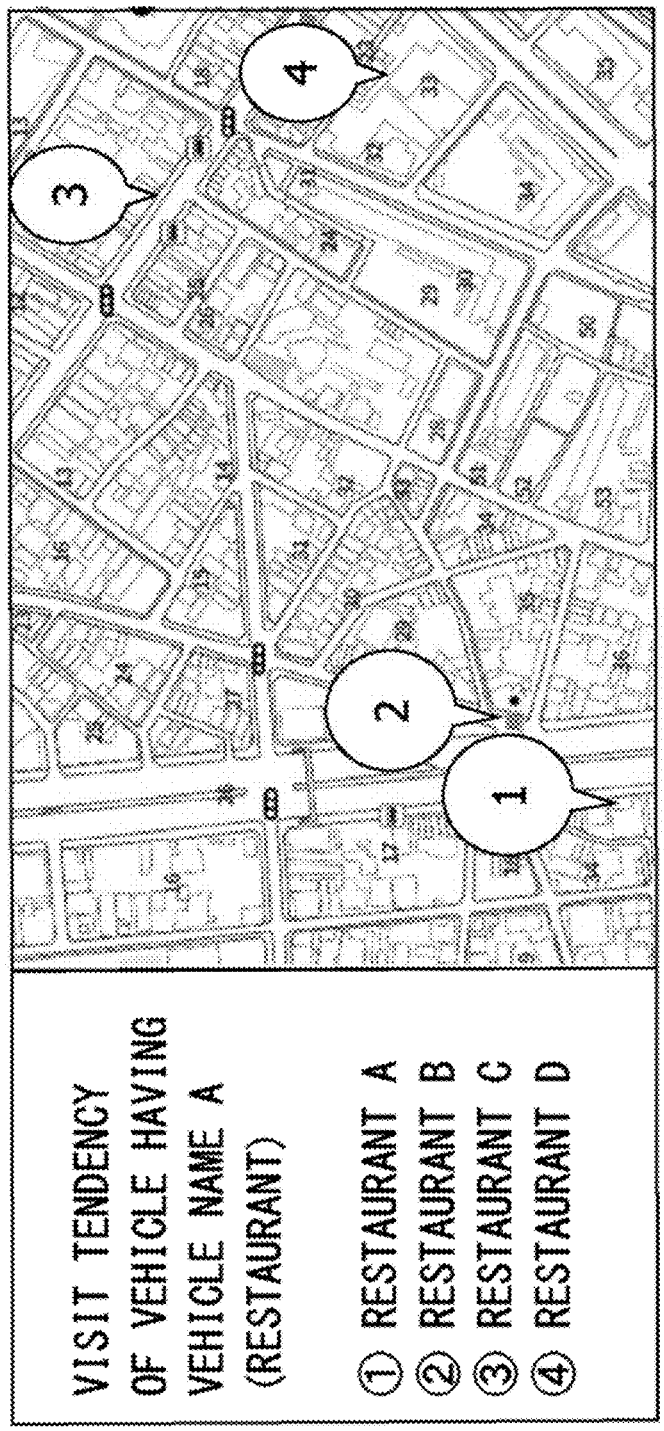
FIG. 16 is a diagram illustrating an example of an output of tendency information.

FIG. 16 is a diagram illustrating an example of an output of the tendency information. FIG. 16 is an example of an output of the tendency information when the extraction condition and the totaling condition are the same as the example illustrated in each of FIGS. 14 and 15, and a display on a map is specified as the output condition. In the case of the display on the map as the output format, the information indicating the position is required. For example, in the case of the data structure of the visit history information illustrated in FIG. 7, the attributes indicating the position are two attributes of the "spot ID" and the "position" of the visit spot information.

Accordingly, in the case where the output on the map is specified as the output condition and none of the attribute "spot ID" and "position" in the visit spot information is specified by the totaling condition, the controller 11 adds the attribute "position" in the visit spot information to the totaling condition, for example. The controller 11 performs the multiplex cross totaling according to at least two attributes included in the totaling condition specified by the user and the attribute "position" in the visit spot information. Note that since the number of categories of the attribute "position" is enormous, the categories of the attribute "position" are categorized in block units and are treated as category data.

In the case of the display on the map, the information to be displayed may be narrowed down by specifying the category included in the attribute included in the vehicle information specified by the totaling condition and/or the category included in the attribute not used for the cross totaling included in the visit spot information. The information to be displayed can be narrowed down by a user's operation on the display screen for output of the tendency information. In the example illustrated in FIG. 16, the information to be displayed is narrowed down by specifying the category "vehicle name A" included in the attribute "vehicle name" included in the vehicle information specified by the totaling condition and the category "restaurant" included in the attribute "large genre" not used for the cross totaling included in the visit spot information.

As one of methods of displaying the magnitude of the number of visits on the map, among the categories included in the attribute in the visit spot information used for the totaling condition, the top N (N: a positive integer) categories in descending order or in ascending order of the number of visits may be extracted and displayed in a range of the map being displayed, for example. In the example illustrated in FIG. 16, as the totaling results narrowed down to the range of the map on which the categories "vehicle A" and "restaurant" are displayed, among the categories included in the attribute "spot ID" in the visit spot information used for the totaling condition, the positions of the top four categories "restaurant A" to "restaurant D" in descending order of the number of visits are displayed on the map. Note that, in this case, the information about each of the top N restaurants may be also displayed outside the map display area, for example. As in the example illustrated in FIG. 16, the output format indicating the top N spots in descending order of the number of visits on the map is effective for a service for proposing stores and facilities according to the tendency of the vehicle information, in a navigation system or the like, for example.

As one of methods of displaying the magnitude of the number of visits on the map, there are a method of classifying the magnitude of the number of visits into classes and indicating the classes in a color-coded manner or by gradation, or a method of indicating a stacked graph of the number of visits to each spot or block in 3D.

Figure 17:
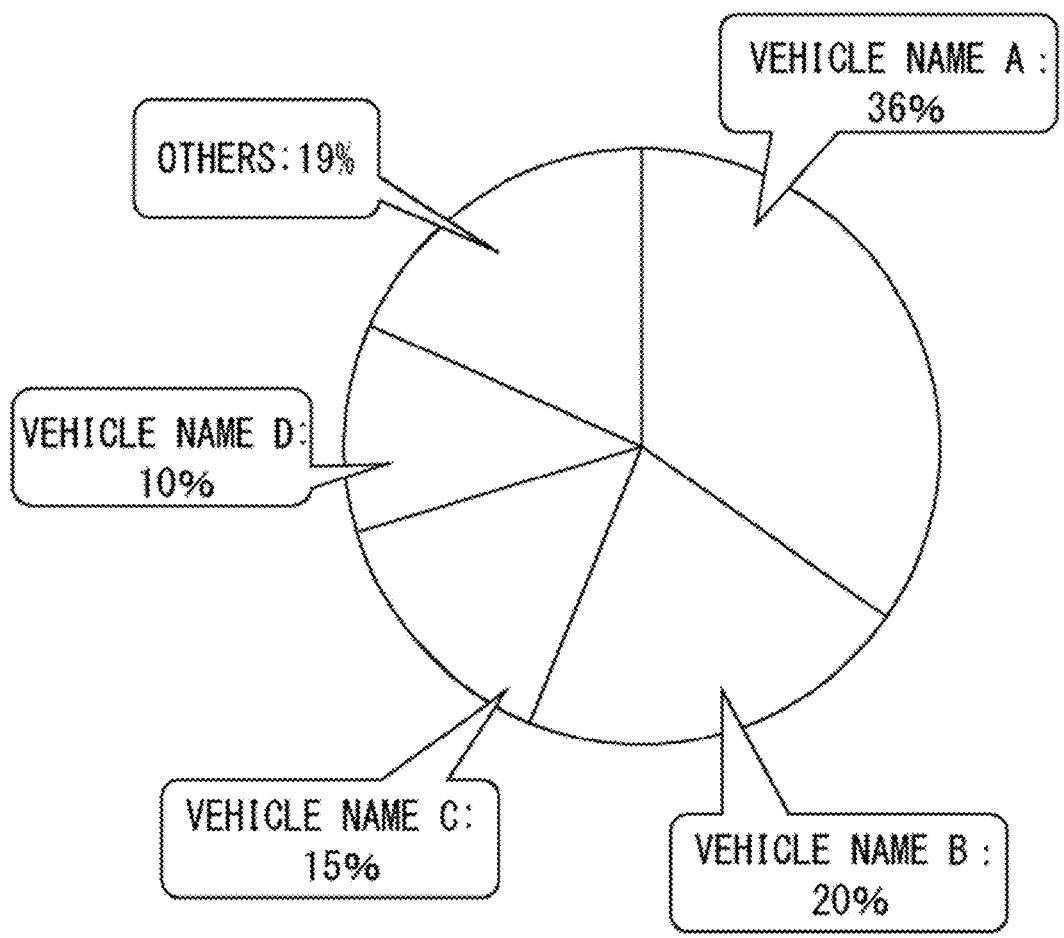
FIG. 17 is a diagram illustrates an example of an output of tendency information.

FIG. 17 illustrates an example of an output of the tendency information. FIG. 17 is an example of an output of the tendency information when the extraction condition and the totaling condition are the same as the example illustrated in FIG. 14, and a pie chart is specified as the output condition. FIG. 17 illustrates a pie chart indicating the proportion for each of vehicle names of the vehicles that visit one spot in the example illustrated in FIG. 14. In the cross totaling, the proportion can be acquired together with the number of visits (frequency). Using this proportion enables the tendency information to be represented by the pie chart, the band chart or the like. In the case where the pie chart or the band chart is used, in the example in FIG. 17, it is understandable intuitively what proportion is occupied by each vehicle name with respect to the vehicles that visit the target spot.

Operation and Effect of First Embodiment

According to the first embodiment, the tendency on the visit spot can be acquired according to the vehicle information which does not necessarily allow an individual vehicle or an individual user associated with the vehicle to be identified but reflects the attributes of the owner or the like. For example, the information indicating the tendency on the visit spot according to the vehicle information can be applied to various services as illustrated in FIGS. 14 to 17, and new business can be created.

Since the vehicle information according to the first embodiment is information which does not allow an individual vehicle or an individual such as an owner to be identified, the vehicle information gives an information provider less feeling of resistance, which makes it possible to easily invite the information provider.

Modified Example of First Embodiment

In the first embodiment, the center server 1 reforms the provision information acquired from each of the in-vehicle device 2, the camera 3, and the SNS server 4, acquires the visit history information, and performs the totaling for the visit history information, thereby acquiring the tendency information indicating the tendency on the visit spot for each vehicle sort. In the modified example, the center server 1 acquires movement tendency information indicating a tendency for a vehicle to move between spots, that is, the vehicle moves from which visit spot to which visit spot.

In the modified example, the center server 1 acquires spot-to-spot movement history information indicating the information about movement between spots, from the provision information from the information source, and totals numbers of records of the spot-to-spot movement history information according to an acquisition request for the movement tendency information. The spot-to-spot movement history information is an example of "second information."

Since ability of continuously and individually identifying the vehicle is required to acquire the information about the vehicle movement between spots, an information source of the spot-to-spot movement history information in the modified example is the in-vehicle device 2 that can transmit the identification information of the vehicle 20. However, the information source is not limited to the in-vehicle device 2. For example, in the case where the vehicle can be individually identified from the captured image including the vehicle, the camera 3 and the SNS server 4 may be the information sources of the spot-to-spot movement history information.

FIG. 18 illustrates an example of a data structure of the spot-to-spot movement history information DB 19B. The spot-to-spot movement history information DB 19B stores the spot-to-spot movement history information. One record in the spot-to-spot movement history information DB 19B corresponds to one piece of spot-to-spot movement history information. The data structure of the spot-to-spot movement history information DB 19B illustrated in FIG. 18 includes fields for an occurrence date, vehicle information, and visit spot information.

The data indicating a date of occurrence of movement between two spots by a vehicle indicated by the record is stored in the field for the occurrence date. The field for the vehicle information includes subfields for a vehicle ID, a vehicle name, a vehicle type, a body color, a vehicle model year, and a luxury rank. The data indicating identification information of the vehicle 20 is stored in the subfield for vehicle ID. In the subfield for each of the vehicle name, the vehicle type, the body color, the vehicle model year, and the luxury rank, the data similar to that stored in each of the corresponding subfields in the visit history information DB 19 in the first embodiment is stored.

The field for the visit spot information further includes fields for a visit spot #1 and a visit spot #2. The data indicating a spot of a movement source in the movement between two spots by the vehicle indicated by the record is stored in the field for the visit spot #1. The data indicating a spot of a movement destination in the movement between two spots by the vehicle indicated by the record is stored in the field for the visit spot #2. Each of the field for the visit spot #1 and the field for the visit spot #2 includes subfields for a spot ID, a large genre, a medium genre, a small genre, a position, and a price range. In the subfield for each of the spot ID, the large genre, the medium genre, the small genre, the position, and the price range, the data similar to that stored in each of the corresponding subfields in the visit history information DB 19 in the first embodiment is stored. Note that the data structure of the spot-to-spot movement history information DB 19B is not limited to the example illustrated in FIG. 18.

Figure 19:
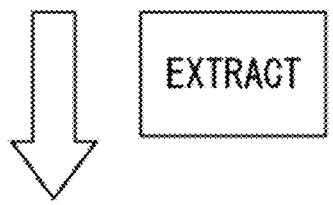
FIG. 19 illustrates an example of a data structure of a vehicle provision information database in a modified example.

FIG. 19 illustrates an example of a data structure of the vehicle provision information DB 16 in the modified example. The data structure of the vehicle provision information DB 16 in the modified example illustrated in FIG. 19 includes fields for a time stamp, a vehicle ID, a vehicle type, a body color, a vehicle model year, position information, and a spot ID.

The data indicating each of a time stamp, identification information, a vehicle type, a body color, a vehicle model year, and position information that are included in the provision information from the in-vehicle device 2 is stored in the corresponding field for each of the time stamp, the vehicle ID, the vehicle type, the vehicle body, the vehicle model year, and the position information.

The identification information of the spot indicated by the position information included in the provision information from the in-vehicle device 2 is stored in the field for the spot ID. When receiving the provision information from the in-vehicle device 2, the controller 11 acquires, with reference to the spot information DB 14, the identification information of the spot corresponding to the position information included in the provision information, and stores the acquired information in the field for the spot ID of the record in the vehicle provision information DB 16. Note that the registration process of the provision information from the other in-vehicle devices 2 to the vehicle provision information DB 16 is similar to that in the first embodiment.

Next, the registration of a record to the spot-to-spot movement history information DB 19B from the record in the vehicle provision information DB 16 is as follows, for example. The controller 11 extracts a set of two records indicating movement between two spots by one vehicle from the records in the vehicle provision information DB 16.

The conditions for extracting the two records indicating movement between two spots by one vehicle are as follows.

(Condition 1) The data in the field for the vehicle ID includes the same value between the two records.

(Condition 2) A length in the date and time indicated by the data in the field for the time stamp between the two records is within a range of a predetermined length in time. The range of the predetermined length in time is set within a range of 1 to 3 hours, for example.

(Condition 3) The data in the field for the spot ID includes a different value between the two spot records.

When acquiring the two records indicating the movement between two spots by one vehicle, the controller 11 acquires, from the two records, the data indicating each of the occurrence date, the vehicle ID, the vehicle type, the body color, the vehicle model year, the spot ID of the visit spot #1, and the spot ID of the visit spot #2. Between the two records, the record including the earlier date and time indicated by the data in the field for the time stamp is a record corresponding to the spot of the movement source, and the record including the later date and time is a record corresponding to the spot of the movement destination.

As the data indicating the occurrence date, the data in the field for the time stamp of the record corresponding to the spot of the movement destination is acquired, for example. As the data indicating each of the vehicle ID, the vehicle type, the body color, and the vehicle model year, the data in the field for each of the vehicle ID, the vehicle type, the body color, and the vehicle model year is acquired from any of the two records. Note that the data indicating each of the vehicle ID, the vehicle type, the body color, and the vehicle model year includes the same value between the two records.

As the data indicating the spot ID of the visit spot #1, the data in the field for the spot ID of the record corresponding to the spot of the movement source is acquired. As the data indicating the spot ID of the visit spot #2, the data in the field for the spot ID of the record corresponding to the spot of the movement destination is acquired.

Next, the controller 11 reforms the data acquired from the extracted two records according to the data structure of the record in the spot-to-spot movement history information DB 19B, and acquires the spot-to-spot movement history information. The reformation of the data is as described in the first embodiment.

When receiving the input of the acquisition request for the movement tendency information, the controller 11 totals numbers of records of the spot-to-spot movement history information with reference to the spot-to-spot movement history information DB 19B. The extraction condition, the totaling condition, and the output condition are input together with the acquisition request for the movement tendency information. Note the extraction condition and the output condition are as described in the first embodiment. As the totaling condition in the modified example, it is necessary to identify at least one attribute for each of the vehicle information, the visit spot #1 and the visit spot #2.

FIG. 20 illustrates an example of an output of the movement tendency information. In the movement tendency information illustrated in FIG. 20, the predetermined time period, and the category "restaurant" of the attribute "large genre" for the visit spot #1 and the visit spot #2 are specified by the extraction condition. In addition, the attribute "vehicle name" in the vehicle information, and the attribute "medium genre" for the visit spot #1 and the visit spot #2 are specified by the totaling condition. That is, the movement tendency information illustrated in FIG. 20 indicates, for each vehicle name, the tendency of movement from what genre of restaurant to what genre of restaurant in the predetermined time period. Note that in FIG. 20, the attribute "vehicle name" in the vehicle information, the attribute "medium genre" of the visit spot #1, and the attribute "medium genre" of the visit spot #2, which are used for the totaling, in the spot-to-spot movement history information are displayed. In addition, the number of occurrences is frequency.

For example, based on the output of the movement tendency information illustrated in FIG. 20, it is possible to propose a restaurant of the genre that highly tends to be visited next from the restaurant of the genre at which a vehicle driven by the user is currently positioned, according to the vehicle name of the vehicle, in the navigation system or the like. Therefore, according to the modified example, the tendency of movement between spots according to the vehicle sort can be acquired, whereby it is possible to propose the spot that is likely to be visited next from the spot at which the vehicle is currently positioned, according to the vehicle sort. The spot to be proposed is likely to become a spot at which the user wants to visit next and can provide useful information.

Other Embodiments

The above-described embodiment is only an example and the present disclosure can be appropriately modified without departing from the gist thereof.

In the above-described embodiment, the attributes included in the vehicle information and the visit spot information are used for the totaling, but the attributes used for the totaling are not limited to thereto. Examples of other attributes used for the totaling includes time information, number of passengers, and a district. For the attributes used for the totaling, the information is required to be collected from each information source to acquire the data used for the totaling. For example, for the time information, the attributes used for the totaling include a year, a month, a day of the week, a time slot, a season, and a staying time. For example, the number of passengers of the vehicle may be detected by a sensor mounted in the vehicle 20 and transmitted from the in-vehicle device 2 to the center server 1 as one of the provision information.

The processes or means which have been described above in the present disclosure can be freely combined unless any technical conflict occurs.

A process which has been described to be performed by a single device may be distributed to and performed by a plurality of devices. Alternatively, processes which have been described to be performed by different devices may be performed by a single device. In a computer system, by what hardware configuration (server configuration) each function is to be embodied can be flexibly changed.

The present disclosure can also be embodied by supplying a computer program storing the functions described above in the above-described embodiment to a computer and causing one or more processors of the computer to read and execute the computer program. Such a computer program may be provided to the computer via a non-transitory computer-readable storage medium which can access a system bus of the computer or may be provided to the computer via a network. Examples of the non-transitory computer-readable storage medium include an arbitrary type of disk such as a magnetic disk (such as a Floppy (registered trademark) disk or a hard disk drive (HDD)) or an optical disc (such as a CD-ROM, a DVD disc, or a blue-ray disc), and an arbitrary type of medium which is suitable for storing electronic commands such as a read only memory (ROM), a random access memory (RAM), an EPROM, an EEPROM, a magnetic card, a flash memory, an optical card.

What is claimed is:

1. An information processing apparatus, comprising a controller including at least one processor configured to execute:

receiving first information about a plurality of vehicles, the first information being based on information acquired in real-time from a plurality of in-vehicle devices that are respectively mounted on the plurality of vehicles at a predetermined cycle, the first information including vehicle information being associated with at least one piece of data classified as any one of a plurality of attributes about a vehicle, the vehicle information not being capable of identifying an individual user or an individual vehicle but reflecting at least part of attributes or preferences of a user associated with the vehicle, the first information including spot information being associated with at least one piece of data classified as any one of a plurality of attributes about a visit spot of the vehicle, and the first information including time information being associated with at least one piece of data classified as any one of a plurality of attributes about time;

receiving the first information based on information acquired from a plurality of cameras installed at a position associated with a predetermined spot at a predetermined cycle, the plurality of cameras include first cameras that are installed in each site of stores and facilities and whose capturing range is a parking lot in the site, and second cameras that are installed along a road and whose capturing range is a part of the road;

acquiring the vehicle information from captured images by the plurality of cameras;

acquiring the spot information from information about the predetermined spot at which the plurality of cameras is installed;

acquiring the first information based on a post on an social networking service (SNS) from a plurality of SNS servers;

acquiring the vehicle information from at least one of a message and an image included in the post;

acquiring the spot information from at least one of position information and the message included in the post;

reforming, into a common format, the vehicle information and the spot information included in the first information which is received from the plurality of in-vehicle devices, the vehicle information acquired from the captured images, the spot information acquired from the information about the predetermined spot, the vehicle information acquired from the at least one of the message and the image, and the spot information acquired from the at least one of the position information and the message, and acquiring the reformed first information including the reformed vehicle information and the reformed spot information;

receiving an input of an extraction condition for extracting first information used for totaling, from a user terminal or a display on an operation terminal of the information processing apparatus, the extraction condition being about the vehicle information, the spot information and the time information;

extracting the first information satisfying the extraction condition, from the reformed first information about the plurality of vehicles;

receiving an input of a totaling condition including specification of an attribute used for totaling, the totaling condition being about the vehicle information and the spot information, from the user terminal or the display on the operation terminal;

totaling numbers of records of the first information extracted about the plurality of vehicles according to at least one attribute of the plurality of attributes associated with the vehicle information, at least one attribute of the plurality of attributes associated with the spot information, and at least one attribute of the plurality of attributes associated with the time information, which are specified by the input of the totaling condition received;

acquiring second information including the vehicle information about one vehicle, and the spot information about each of a visit spot of a movement source and a visit spot of a movement destination, the second information indicating a history in which the one vehicle has moved from the visit spot of the movement source to the visit spot of the movement destination based on the first information totaled;

acquiring tendency information indicating a tendency for a vehicle to move between two visit spots including the visit spot of the movement source and the visit spot of the movement destination, for each classification based on the vehicle information, from the second information about the plurality of vehicles, wherein the tendency information is based at least on a family structure of the user of the vehicle that has been determined based on a number of passengers of the vehicle;

receiving an input of an output condition for specifying an output format of the tendency information, from the user terminal or the display on the operation terminal;

creating the tendency information in the output format specified by the output condition; and outputting the tendency information created, to the user terminal or the display on the operation terminal, the user terminal or the display on the operation terminal being input the output condition, wherein the plurality of attributes associated with the vehicle information comprises two or more attributes among identification information of a vehicle, a vehicle name, a vehicle body style, a body color, a vehicle model year, and the number of passengers, the number of passengers having been detected by a sensor mounted in the vehicle and transmitted to the information processing apparatus, wherein the plurality of attributes associated with the spot information comprises two or more attributes among identification information of a spot, a position of the spot, and a genre of the spot;

wherein the plurality of attributes associated with the time information comprises two or more attributes among a date and time, a year, a month, a day of a week, a time slot, a season, and a staying time; and wherein the controller is further configured to:
  determine, in the process of extracting the first information, in reaction to the input of the extraction condition, for the vehicle information, the spot information, and the time information related to each of the two visit spots:
    whether values of the identification information of the vehicle associated with the vehicle information match;
    whether values of the date and time associated with the time information are within a range of a predetermined length in time; and
    whether values of the identification information of the spot associated with the spot information are different; and
  extract the first information, in a case where:
    the values of the identification information of the vehicle associated with the vehicle information related to the each of the two visit spots match;
    the values of the date and time associated with the time information related to the each of the two visit spots are within the range of the predetermined length in time; and
    the values of the identification information of the spot associated with the spot information related to the each of the two visit spots are different.

2. The information processing apparatus according to claim 1, wherein
the output format includes at least one of a totaling table, a list, a pie chart, and a band chart.

3. An information processing method, comprising:
receiving first information about a plurality of vehicles, the first information being based on information acquired in real-time from a plurality of in-vehicle devices that are respectively mounted on the plurality of vehicles at a predetermined cycle, the first information including vehicle information being associated with at least one piece of data classified as any one of a plurality of attributes about a vehicle, the vehicle information not being capable of identifying an individual user or an individual vehicle but reflecting at least part of attributes or preferences of a user associated with the vehicle, the first information including spot information being associated with at least one piece of data classified as any one of a plurality of attributes about a visit spot of the vehicle, and the first information including time information being associated with at least one piece of data classified as any one of a plurality of attributes about time;

receiving the first information based on information acquired from a plurality of cameras installed at a position associated with a predetermined spot at a predetermined cycle, the plurality of cameras include first cameras that are installed in each site of stores and facilities and whose capturing range is a parking lot in the site, and second cameras that are installed along a road and whose capturing range is a part of the road;

acquiring the vehicle information from captured images by the plurality of cameras;

acquiring the spot information from information about the predetermined spot at which the plurality of cameras is installed;

acquiring the first information based on a post on an social networking service (SNS) from a plurality of SNS servers;

acquiring the vehicle information from at least one of a message and an image included in the post;

acquiring the spot information from at least one of position information and the message included in the post;

reforming, into a common format, the vehicle information and the spot information included in the first information which is received from the plurality of in-vehicle devices, the vehicle information acquired from the captured images, the spot information acquired from the information about the predetermined spot, the vehicle information acquired from the at least one of the message and the image, and the spot information acquired from the at least one of the position information and the message, and acquiring the reformed first information including the reformed vehicle information and the reformed spot information;

receiving an input of an extraction condition for extracting first information used for totaling, the extraction condition being about the vehicle information, the spot information and the time information, from a user terminal or a display on an operation terminal of an information processing apparatus;

extracting the first information satisfying the extraction condition, from the reformed first information about the plurality of vehicles;

receiving an input of a totaling condition including specification of an attribute used for totaling, the totaling condition being about the vehicle information and the spot information, from the user terminal or the display on the operation terminal;

totaling numbers of records of the first information extracted about the plurality of vehicles according to at least one attribute of the plurality of attributes associated with the vehicle information, at least one attribute of the plurality of attributes associated with the spot information, and at least one attribute of the plurality of attributes associated with the time information, which are specified by the input of the totaling condition received;

acquiring second information including the vehicle information about one vehicle, and the spot information about each of a visit spot of a movement source and a visit spot of a movement destination, the second information indicating a history in which the one vehicle has moved from the visit spot of the movement source to the visit spot of the movement destination based on the first information totaled;

acquiring tendency information indicating a tendency for a vehicle to move between two visit spots including the visit spot of the movement source and the visit spot of the movement destination, for each classification based on the vehicle information, from the second information about the plurality of vehicles, wherein the tendency information is based at least on a family structure of the user of the vehicle that has been determined based on a number of passengers of the vehicle;

receiving an input of an output condition for specifying an output format of the tendency information, from the user terminal or the display on the operation terminal;

creating the tendency information in the output format specified by the output condition; and outputting the tendency information created, to the user terminal or the display on the operation terminal, the user terminal or the display on the operation terminal being input the output condition, wherein the plurality of attributes associated with the vehicle information comprises two or more attributes among identification information of a vehicle, a vehicle name, a vehicle body style, a body color, a vehicle model year, and the number of passengers, the number of passengers having been detected by a sensor mounted in the vehicle and transmitted to the information processing apparatus, wherein the plurality of attributes associated with the spot information comprises two or more attributes among identification information of a spot, a position of the spot, and a genre of the spot;

wherein the plurality of attributes associated with the time information comprises two or more attributes among a date and time, a year, a month, a day of a week, a time slot, a season, and a staying time; and wherein the information processing method further comprises:
  determining, in the process of extracting the first information, in reaction to the input of the extraction condition, for the vehicle information, the spot information, and the time information related to each of the two visit spots:
    whether values of the identification information of the vehicle associated with the vehicle information match;
    whether values of the date and time associated with the time information are within a range of a predetermined length in time; and
    whether values of the identification information of the spot associated with the spot information are different; and
  extracting the first information, in a case where:
    the values of the identification information of the vehicle associated with the vehicle information related to the each of the two visit spots match;
    the values of the date and time associated with the time information related to the each of the two visit spots are within the range of the predetermined length in time; and
    the values of the identification information of the spot associated with the spot information related to the each of the two visit spots are different.

4. A non-transitory storage medium storing a program for causing a computer to execute:

receiving first information about a plurality of vehicles, the first information being based on information acquired in real-time from a plurality of in-vehicle devices that are respectively mounted on the plurality of vehicles at a predetermined cycle, the first information including vehicle information being associated with at least one piece of data classified as any one of a plurality of attributes about a vehicle, the vehicle information not being capable of identifying an individual user or an individual vehicle but reflecting at least part of attributes or preferences of a user associated with the vehicle, the first information including spot information being associated with at least one piece of data classified as any one of a plurality of attributes about a visit spot of the vehicle, and the first information including time information being associated with at least one piece of data classified as any one of a plurality of attributes about time;

receiving the first information based on information acquired from a plurality of cameras installed at a position associated with a predetermined spot at a predetermined cycle, the plurality of cameras include first cameras that are installed in each site of stores and facilities and whose capturing range is a parking lot in the site, and second cameras that are installed along a road and whose capturing range is a part of the road;

acquiring the vehicle information from captured images by the plurality of cameras;

acquiring the spot information from information about the predetermined spot at which the plurality of cameras is installed;

acquiring the first information based on a post on an social networking service (SNS) from a plurality of SNS servers;

acquiring the vehicle information from at least one of a message and an image included in the post;

acquiring the spot information from at least one of position information and the message included in the post;

reforming, into a common format, the vehicle information and the spot information included in the first information which is received from the plurality of in-vehicle devices, the vehicle information acquired from the captured images, the spot information acquired from the information about the predetermined spot, the vehicle information acquired from the at least one of the message and the image, and the spot information acquired from the at least one of the position information and the message, and acquiring the reformed first information including the reformed vehicle information and the reformed spot information;

receiving an input of an extraction condition for extracting first information used for totaling, from a user terminal or a display on an operation terminal of an information processing apparatus, the extraction condition being about the vehicle information, the spot information and the time information;

extracting the first information satisfying the extraction condition, from the reformed first information about the plurality of vehicles;

receiving an input of a totaling condition including specification of an attribute used for totaling, the totaling condition being about the vehicle information and the spot information, from the user terminal or the display on the operation terminal;

totaling numbers of records of the first information extracted about the plurality of vehicles according to at least one attribute of the plurality of attributes associated with the vehicle information, at least one attribute of the plurality of attributes associated with the spot information, and at least one attribute of the plurality of attributes associated with the time information, which are specified by the input of the totaling condition received;

acquiring second information including the vehicle information about one vehicle, and the spot information about each of a visit spot of a movement source and a visit spot of a movement destination, the second information indicating a history in which the one vehicle has moved from the visit spot of the movement source to the visit spot of the movement destination based on the first information totaled;

acquiring tendency information indicating a tendency for a vehicle to move between two visit spots including the visit spot of the movement source and the visit spot of the movement destination, for each classification based on the vehicle information, from the second information about the plurality of vehicles, wherein the tendency information is based at least on a family structure of the user of the vehicle that has been determined based on a number of passengers of the vehicle;

receiving an input of an output condition for specifying an output format of the tendency information, from the user terminal or the display on the operation terminal;

creating the tendency information in the output format specified by the output condition; and outputting the tendency information created, to the user terminal or the display on the operation terminal, the user terminal or the display on the operation terminal being input the output condition, wherein the plurality of attributes associated with the vehicle information comprises two or more attributes among identification information of a vehicle, a vehicle name, a vehicle body style, a body color, a vehicle model year, and the number of passengers, the number of passengers having been detected by a sensor mounted in the vehicle and transmitted to the information processing apparatus wherein the plurality of attributes associated with the spot information comprises two or more attributes among identification information of a spot, a position of the spot, and a genre of the spot;

wherein the plurality of attributes associated with the time information comprises two or more attributes among a date and time, a year, a month, a day of a week, a time slot, a season, and a staying time; and wherein the program further causes the computer to:

determine, in the process of extracting the first information, in reaction to the input of the extraction condition, for the vehicle information, the spot information, and the time information related to each of the two visit spots:

whether values of the identification information of the vehicle associated with the vehicle information match;

whether values of the date and time associated with the time information are within a range of a predetermined length in time; and whether values of the identification information of the spot associated with the spot information are different; and extract the first information, in a case where:

the values of the identification information of the vehicle associated with the vehicle information related to the each of the two visit spots match;

the values of the date and time associated with the time information related to the each of the two visit spots are within the range of the predetermined length in time; and the values of the identification information of the spot associated with the spot information related to the each of the two visit spots are different.

* * * * *